United States Patent
Walch

(10) Patent No.: US 7,724,956 B2
(45) Date of Patent: May 25, 2010

(54) SYSTEMS AND METHODS FOR IDENTIFYING CHARACTERS AND WORDS IN A DOCUMENT

(75) Inventor: Mark A. Walch, Woodbridge, VA (US)

(73) Assignee: Gannon Technologies Group LLC, McLean, VA (US)

(*) Notice: Subject to any disclaimer, the term of this patent is extended or adjusted under 35 U.S.C. 154(b) by 1831 days.

(21) Appl. No.: 10/791,375

(22) Filed: Mar. 1, 2004

(65) Prior Publication Data
US 2008/0247674 A1  Oct. 9, 2008

Related U.S. Application Data

(60) Provisional application No. 60/450,948, filed on Feb. 28, 2003.

(51) Int. Cl.
*G06K 9/18* (2006.01)

(52) U.S. Cl. .................... 382/186; 382/181

(58) Field of Classification Search .......... 382/173, 382/186, 189
See application file for complete search history.

(56) References Cited

U.S. PATENT DOCUMENTS

| | | | |
|---|---|---|---|
| 4,961,231 A | 10/1990 | Nakayama et al. | |
| 5,267,332 A | 11/1993 | Walch et al. | |
| 5,519,786 A | 5/1996 | Courtney et al. | |
| 5,559,895 A | 9/1996 | Lee et al. | |
| 5,719,959 A * | 2/1998 | Krtolica | 382/209 |
| 5,745,600 A | 4/1998 | Chen et al. | |
| 5,854,853 A | 12/1998 | Wang | |
| 5,854,855 A | 12/1998 | Errico et al. | |
| 5,923,793 A | 7/1999 | Ikebata et al. | |
| 5,930,380 A | 7/1999 | Kashi et al. | |
| 5,953,451 A * | 9/1999 | Syeda-Mahmood | 382/187 |
| 6,011,537 A | 1/2000 | Slotznick | |
| 6,108,444 A | 8/2000 | Tanveer | |
| 6,445,820 B1 | 9/2002 | Love | |
| 6,556,712 B1 * | 4/2003 | Loudon et al. | 382/187 |
| 7,240,062 B2 * | 7/2007 | Andersen et al. | 707/100 |
| 2005/0015240 A1 * | 1/2005 | Appleby | 704/9 |

FOREIGN PATENT DOCUMENTS

| | | |
|---|---|---|
| EP | 0166271 A2 | 1/1986 |
| EP | 0702329 A2 | 3/1996 |

OTHER PUBLICATIONS

International Search Report for PCT/US04/29091.

(Continued)

*Primary Examiner*—Brian Q Le
*Assistant Examiner*—Edward Park
(74) *Attorney, Agent, or Firm*—Procopio Cory Hargreaves & Savitch LLP; Noel C. Gillespie

(57) ABSTRACT

A data capture and mining method which enables identification of characters and words through their visible patterns. Specifically, a data capture and mining method involves searching a scanned image using isomorphic, graphical pattern matching techniques that eliminate both the need to convert imaged writing to electronic format through, e.g., OCR and the subsequent need to convert the electronic text into English.

39 Claims, 23 Drawing Sheets

OTHER PUBLICATIONS

Dehghan, M. "Signature Verification using Vhape Vescriptors and multiple Neural Networks" IEEE Tencon 96, Dec. 2, 1997, vol. 1, pp. 415-418.

International Search Report for PCT/US2004/006173 dated Dec. 11, 2008.

Supplementary European Search Report for EP04716134 dated Jul. 9, 2009.

Casey R G et al, "Recursive Segmentation and Classification of Composite Character Patterns." Proceedings of the International Joint Conference on Pattern Recognition. Munich, Oct. 19-22, 1982; New York, IEEE US, vol. 2, Oct. 19, 1982, pp. 1023-1026, XP000601596.

Cavnar W B et al, "N-Gram-Based Matching for Multifield Database Access in Postal Applications." Proceedings, Annual Symposium on Document Analysis & Information Retrieval, XX, XX, April 26, 1993, pp. 287-297, XP000600549.

\* cited by examiner

Link/node structure for characters "A", "B" and "E"

Illustration of data structure

Sample Graph:

Connectivity Indices

| Vertex | Connectivity Array | | |
|---|---|---|---|
| | 3 | 2 | 1 |
| A | 0 | 1 | 0 |
| B | 3 | 1 | 0 |
| C | 3 | 1 | 0 |
| D | 0 | 1 | 0 |
| E | 3 | 1 | 0 |
| F | 3 | 1 | 0 |

|   | Before |   |   |   |   |   |
|---|---|---|---|---|---|---|
| A | 0 | 1 | 0 | 0 | 0 | 1 |
| B | 0 | 0 | 1 | 0 | 0 | 1 |
| C | 0 | 0 | 0 | 1 | 1 | 0 |
| D | 0 | 0 | 0 | 0 | 1 | 0 |
| E | 0 | 0 | 0 | 0 | 0 | 1 |
| F | 0 | 0 | 0 | 0 | 0 | 0 |

|   | After |   |   |   |   |   |
|---|---|---|---|---|---|---|
|   | C | E | B | F | D | A |
| C | 0 | 1 | 1 | 0 | 1 | 0 |
| E | 0 | 0 | 0 | 1 | 1 | 0 |
| B | 0 | 0 | 0 | 1 | 0 | 0 |
| F | 0 | 0 | 0 | 0 | 0 | 1 |
| D | 0 | 0 | 0 | 0 | 0 | 0 |
| A | 0 | 0 | 0 | 0 | 0 | 0 |

FIG. 10

*Examples of Glyphs Embedded in Cursive Word*

FIG. 11

*Examples of Known Characters Embedded in Unknown Graphs*

Hou Hou Ho bous bous ous sto sto sto

FIG. 12

Examples of Edge Masking to Isolate Embedded Graphs

Edge  1 2 3 4 5 6
Mask  1 1 1 0 0 0

Edge  1 2 3 4 5 6
Mask  0 0 1 0 1 1

Edge  1 2 3 4 5 6
Mask  1 0 1 1 1 0

Edge  1 2 3 4 5 6
Mask  1 0 1 0 0 1

Creation of the Baseline Path

Item a.

Item e.

Item 1b.

Item f.

Item c.

Item g.

Item a.

Item b.

Pixel Patterns for Segmenting Zones (decreasing)  (increasing)  (max & min)  (flat)

Item a.

Item b.

Item c.

SYSTEMS AND METHODS FOR IDENTIFYING CHARACTERS AND WORDS IN A DOCUMENT

RELATED APPLICATIONS INFORMATION

This application claims priority under 35 U.S.C.§119 to U.S. Provisional Patent Application Ser. No. 60/450,948 entitled, "Source Language Word Pattern Matching System," filed on Feb. 28, 2003, which is incorporated herein by reference in its entirety as if set forth in full.

BACKGROUND OF THE INVENTION

1. Field of the Invention

The field of the invention relates generally to word recognition in written documents and more particularly to providing the ability to search imaged documents directly and identify words in their source language.

2. Background Information

Accurate character recognition is crucial in today's document processing environment. For example, in the intelligence community, it is often of great importance to search a voluminous number of documents for specific key words. Many of those documents, however, may be in a foreign or even an obscure language. In an ideal environment, a staff of translators would translate all the documents into English prior to executing a machine based search program for a specific key word or group of words. Providing for the human translation of a foreign language document into English, prior to conducting a computerized search, optimally ensures that the nuances of the foreign language are realized and accurately captured. This approach, however, is limited due to the shortage of foreign language translators in key languages, such as Arabic, or in exotic languages, such as Pashtu.

To overcome these limitations, a conventional automated document searching system, such as the system depicted in FIG. 1, has been employed. The document searching system 100 comprises three basic components, namely an automatic Optical Character Recognition module ("OCR") 104, an automatic translation module 106, and a search engine 108. Together, these components comprise a conventional image recognition system. As illustrated in FIG. 1, one or more documents 102 are provided to the character recognition module 104, from which characters are extracted. These documents 102 may already exist in electronic form. Alternatively, these documents may be in a physical form. In this case, the system 100 provides a scanner to convert the physical document into electronic form.

The automatic character recognition module 104 is used to discern individual characters from a document. Numerous optical character recognition systems are available to provide this function. Furthermore, if a document is written in a foreign language, the character recognition module 104 will employ OCR software packages tailored to specific foreign languages. In other words, specialized OCR software is capable of identifying characters unique to a foreign language.

Once the optical character recognition is complete, the automatic translation system 106 translates the OCR data from its foreign language into a target language such as English. Once the OCR data is completely translated resulting in searchable data information, the search engine 108 is employed to search for a specific term or concept. Search concepts 110, in their English form are, for example, input into the search engine 108. The search engine 108 scans the document's searchable data information to determine whether the document contains characters, words, or phrases that match the input search concept 110. The documents identified as containing a match 112 are flagged and ultimately reviewed further for pertinence.

The difficulty with conventional document searching systems is that errors accumulate throughout the automatic translation process and the character recognition process. Unfortunately, even with the best character recognition techniques, errors occur due to many factors including but not limited to the poor quality of the original document and extraneous document markings. Also, the inconsistencies inherent in handwriting overwhelm most computer-based recognition systems. Additionally, conventional character recognition techniques quite commonly misinterpret one letter for another. For example, the letter "m" is often interpreted to be the letters "rn". Such a misinterpretation by the character recognition process may ultimately result in an untranslatable word when subsequently subjected to an automatic translation system. Moreover, a slight misinterpretation in characters may lead to similar words in the foreign language, with completely different meanings, being interchanged with one another. As such, any small variation in the original document may result in an erroneous interpretation by the automatic translation system.

Furthermore, the machine translation process results in errors when the machine translation fails to recognize words. Although a word may be properly converted into electronic form from its foreign language, often times the meaning of the word will not survive the machine translation process, thus resulting in data loss. This in turn may ultimately result in a highly important document going undetected.

SUMMARY OF THE INVENTION

A data capture and mining method which enables identification of characters and words through their visible patterns. Specifically, a data capture and mining method involves searching a scanned image using isomorphic, graphical pattern matching techniques that eliminate both the need to convert imaged writing to electronic format through, e.g., OCR and the subsequent need to convert the electronic text into English.

In one aspect, a method and apparatus having the ability to directly search source language documents for critical terms in their source language is provided. Specifically, a library of source language characters and their variations is compiled and stored in a database. Additionally, a lexicon of search concepts in a source language is derived from search concepts in a target language. A graph constructor is then used to generate image graphs for each character in the source language library and each word in the source language lexicon. A pattern matcher is employed to compare images of an input document with the images stored in the source language lexicon. If an image in the document matches a set of character images associated with a specific search concept, the document is flagged for further analysis.

These and other features, aspects, and embodiments of the invention are described in the section entitled "Detailed Description of the Preferred Embodiment."

BRIEF DESCRIPTION OF THE DRAWINGS

Preferred embodiments of the present inventions taught herein, are illustrated by way of example, and not by way of limitation, in the figures of the accompanying drawings, in which:

FIG. 10 is a diagram illustrating an example adjacency matrix key for the connectivity key of FIG. 9 before rearranging and after in accordance with one embodiment;

FIG. 11 is a diagram illustrating word segments;

FIG. 12 is a diagram illustrating known word segments;

DETAILED DESCRIPTION OF THE PREFERRED EMBODIMENTS

In the description of the example embodiments that follow, implementational differences, or unique concerns, relating to different types of systems will be pointed out to the extent possible. Further, while the embodiments below are described in relation to searching documents in their source language for key words defined in a target language, it should be understood that the systems and methods described herein are applicable to any type of image recognition system.

A. Overview

The image recognition system described herein uses pictographic recognition capabilities to accurately identify critical terms shrouded in a foreign language document. Using pictographic recognition to identify documents having critical or key terms results in a revolutionary data capture and mining technology in addition to a unique image recognition system.

In conventional document screening systems, a four step process is required as described above. This process includes scanning the documents to create electronic images, conversion of the scanned images into electronic text using, e.g., OCR, translation of the converted text into a target language such as English through machine translation technologies, and conventional searching of the translated text. As mentioned, the conversion and translation steps can lead to significant errors or reduced accuracy. The systems and method described herein, however, allow these troublesome steps to be bypassed, therefore, producing much more accurate results. Thus, images can be scanned, e.g., in their native language, and the scanned images can be searched directly using graphical templates derived form key search terms, e.g., developed in a target language.

Figure 1:
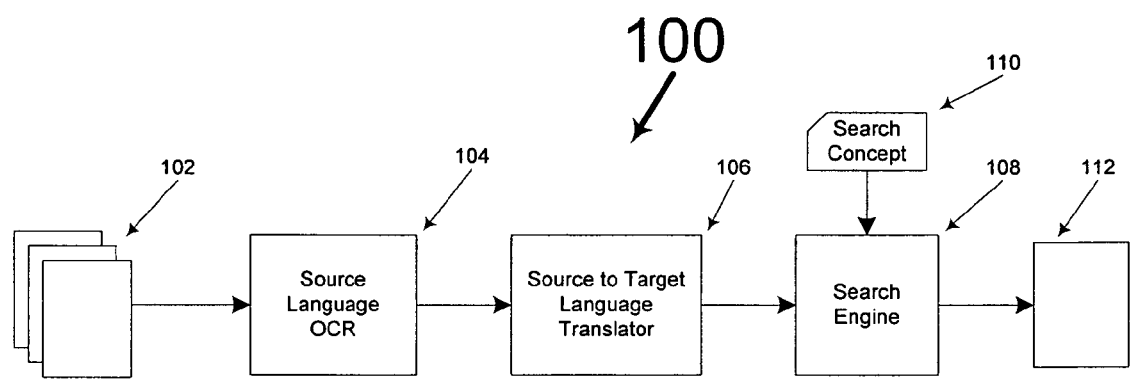
FIG. 1 is a diagram of a conventional document searching system.
Figure 2:
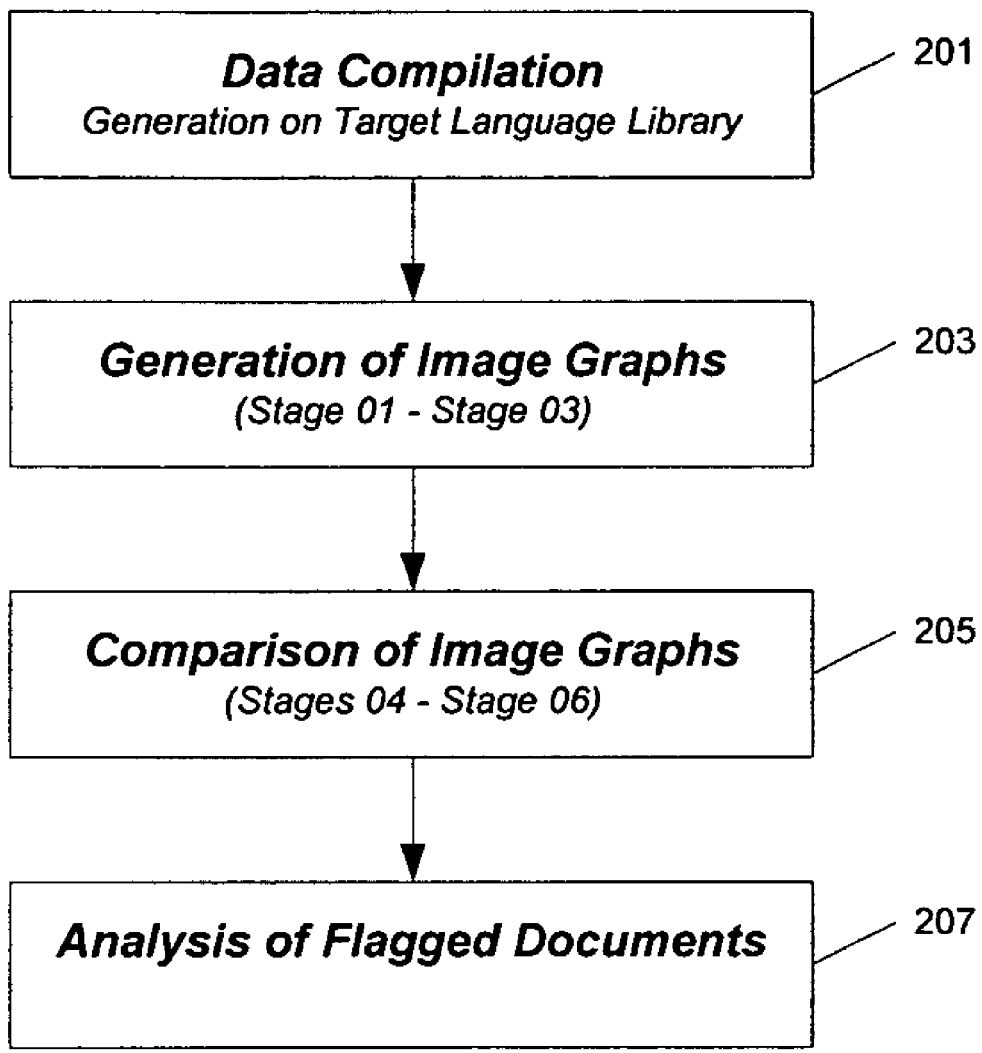
FIG. 2 is a general diagram outlining a data capture and mining method according to one embodiment.

FIG. 2 is a flowchart illustrating the data capture and mining method that result from the unique capabilities of the image recognition system provided herein. In order to perform searching directly on scanned images, and by way of general overview, the data capture and mining method can involve four phases, namely a data compilation phase 201, a image graph generation phase 203, a comparison phase 205, and an analysis phase 207.

The data compilation phase 201 can involve establishing a source language library by gathering characters associated with a foreign, or source, language and their variations. The data compilation phase 201 can then involve creating a lexicon of important search terms and their associated colloquial variations, which can be converted into the foreign language and stored in the source language library. The image graph generation phase 203 generates image graphs for the compiled data. As such, image graphs are constructed for each character and search term stored in the source language library. The image graph comparison phase 205 identifies critical terms by comparing an imaged foreign language document with specific image graphs associated with the critical terms. If a successful match is returned, the analysis phase 207 provides for an in-depth examination of the document flagged as containing the critical term.

The above description of the data capture and mining method is a generalization of the concepts used by the image recognition system described in more detail below. As such, the concepts embodied by the data capture and mining method are applicable to numerous other identification applications. Therefore, the systems and methods described herein should not be limited to only being applicable to identify terms in a foreign language document.

B. The Image Recognition System

Figure 3:
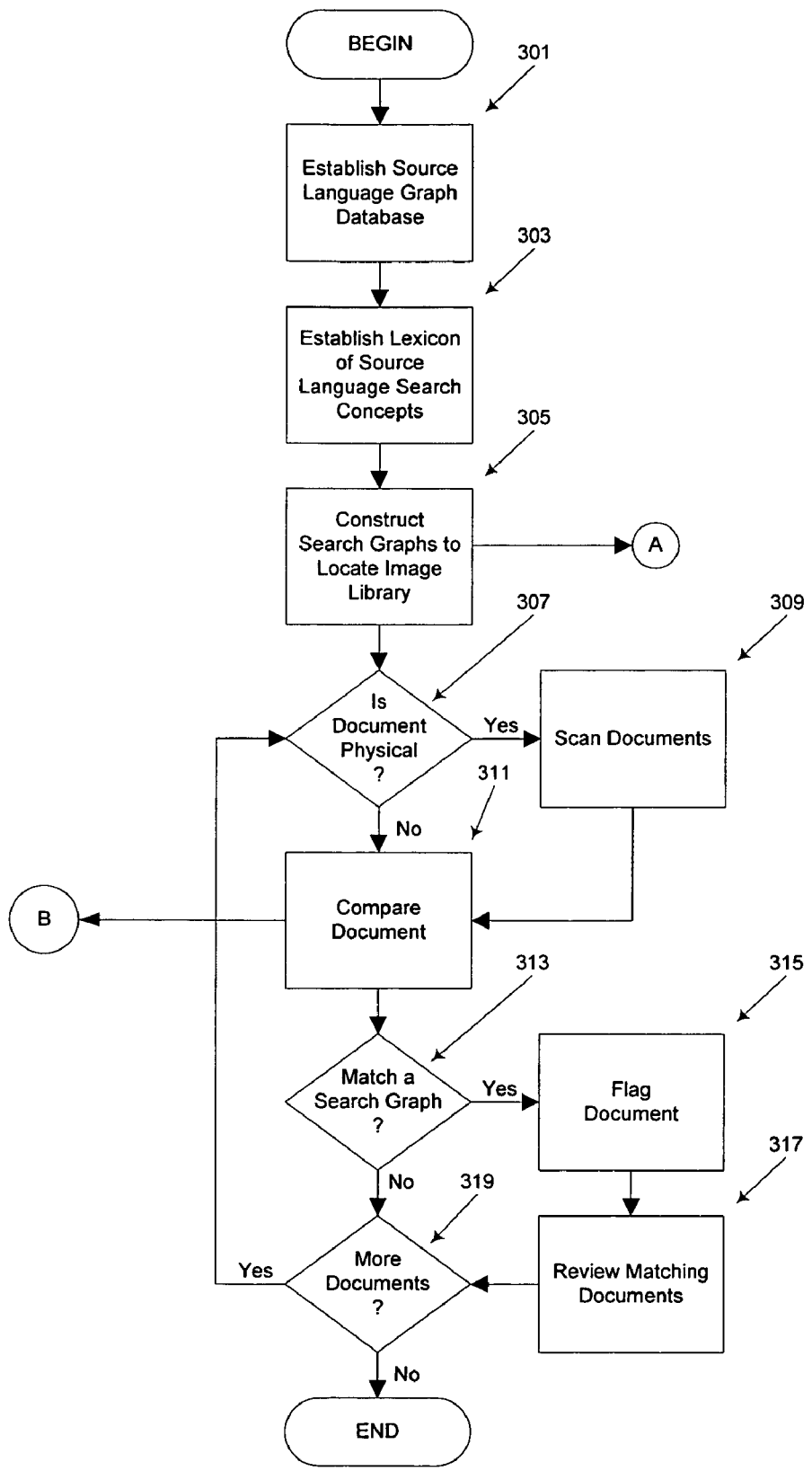
FIG. 3 is a flowchart of an image recognition system configured to identify search terms in a source language using the method of FIG. 2.

FIG. 3 is a detailed flowchart of an image recognition process that provides an efficient method for recognizing typographical and handwritten characters by characterizing and comparing such images upon the basis of their internal structure in accordance with the systems and methods described herein. FIG. 3 provides an overview of the image recognition system and is used as an organizational roadmap throughout the application.

1. Data Compilation & Establishing Target Language Library

As introduced above, foreign language documents can be searched for a critical word or phrase without having to first convert the document from its respective foreign language to a target language such as English. For the purposes of this application, a target language is any language domestic to the system's user while a source or foreign language is any other language not domestic to the user. For simplicity purposes only, the exemplary embodiments described herein use English as the target language.

A source language library is established during the data compilation phase. As such, a user should first select a source language upon which the language library will be built. Source language libraries can be established for a multitude of different source languages and stored in a single source language database thus allowing a user to accommodate documents in numerous different languages. Similarly, the source language library can consist of a single language.

As illustrated in steps 301 and 303 and described below, the data compilation phase can provide for establishing a source language library having a variation of source language characters and for establishing a source language lexicon.

a.) Character Variations

Figure 4:
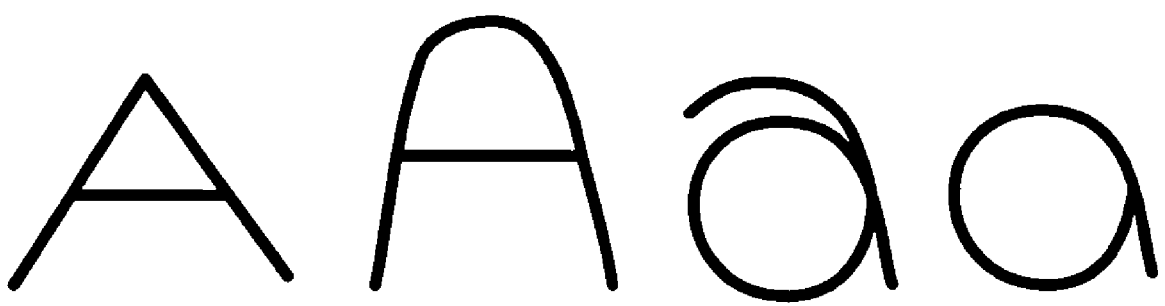
FIG. 4 is a diagram of an allograph of the letter 'a'.

The source language library can be established prior to the actual document search process. Alternatively, the source language library can be established and enhanced during the actual search process described herein. The source language library comprises a set of character templates that illustrate written variations of individual characters. As such, building this library may involve collecting a sufficient number of written samples to capture virtually all variant shapes of each source language character. For example, FIG. 4 illustrates (4) four variants for the letter 'a' that may be compiled for the source language library. As shown, the allograph for the character 'a' consists of at least two variations of an upper case 'A' and at least two variations of a lower case 'a'.

Once the samples have been collected, they can be assigned labels indicating the characters they represent. It is important to note that the accuracy of the image recognition system is directly related to the number of character variations gathered for the source language library. Therefore, if the source language library contains a large number of character variations for each source language character, the probability of misidentifying or misinterpreting a character during the comparison process is significantly decreased.

b.) Source Language Lexicon

The data compilation phase can further include establishing a lexicon pool, as illustrated by step 303. More specifically, the lexicon pool is a compilation of search terms and search concepts identified by a system user. A search term can be any term, or group of terms, that a user wishes to identify in a foreign language document. The phrase "search term" is used interchangeably herein with the phrases' search concept, key word, or critical term.

Establishing the lexicon pool involves identifying search terms in a target language either as individual words or groups of words. Often, the user first identifies the search term in English, or their respective target language. Once the search terms are identified, a human interpreter, fluent in the selected source language, interprets the search terms into the specified source language. For example, an Arabic interpreter can be used to convert English based search terms into Arabic search terms. Although a machine may perform this step, using a human interpreter offers the additional benefits of identifying synonyms and other colloquial variations likely to be used in the source language. Such translations are therefore sensitive to the literal meaning of words as well as their contextual meanings which ultimately result in a powerful and accurate source language lexicon.

It is important to note that the source language lexicon can be a component of the source language library. Therefore, the source language lexicon can be stored in the same database as the character variations thereby providing a single and integrated source language library. Alternatively, the source language lexicon can constitute an entirely separate and interchangeable module of the source language library.

It should also be noted that the source and target languages can be the same language. Thus, the process of converting target language search terms, or concepts, into a source language lexicon may or may not be required, depending on the implementation.

2. Generation of Image Graphs and an Image Graph Library

Once the source language library is established, image recognition technology can be used to generate an image graph for each character and search term stored in the source language library. Image graphs are mathematical graphs established by transforming written characters into skeletal forms or patterns consisting of edges and vertices.

For example, image recognition technology, used to implement the steps described herein, can involve two stages, namely, an image reduction stage (02) and an isomorphic key generation stage (03). Image recognition can then be followed, as described below, by a screening stage, a searching stage, and an interpretation stage. The image reduction stage (02) is responsible for creating the image, or character, graphs. In other words, the characters and search terms contained in the source language library can be converted into image graphs during this stage. The isomorphic key generation stage (03) is responsible for generating isomorphic keys from the character graphs that can be used to search documents as described below.

Further, a physical foreign language document that is selected to be searched is first imaged and then subjected to the image reduction (02) and isomorphic key generation processes. This allows the foreign language document to be compared to image graphs of the search terms. As explained below, the image graphs are compared with graphs generated from imaged documents using associated isomorphic keys to determine whether they are isomorphic. Specifically, the recognition process can include a screening process (Stage 04) and a searching process (Stage 05). The screening process can limit the search scope through inclusion and exclusion testing. After screening, images are compared based on internal image structure. The interpretation process (Stage 06) can return ranked scores of the comparisons. If an imaged document contains a successful match, then the document can be deemed to contain the search term and is pulled for further analysis.

a. Image Reduction

In order to abstract the essence of a structure, such as a character, the character can be reduced to a skeleton image that is represented in memory as idealized nodes, or vertices, and lines, or edges. A unique representation of the skeletonized image can, for example, be created in the form of a linked list having a data representation that parallels the visual arrangement of the image. Such image recognition technology can then reliably interpret both handwritten characters, printed characters, and symbols, as well as other shapes or graphics, while not requiring any specialized hardware. Importantly, image recognition technology used, for example, to implement the systems and methods described herein can be capable of identifying images regardless of orientation, image size, image distortions, incomplete images, or images embedded with larger forms.

Figure 5:
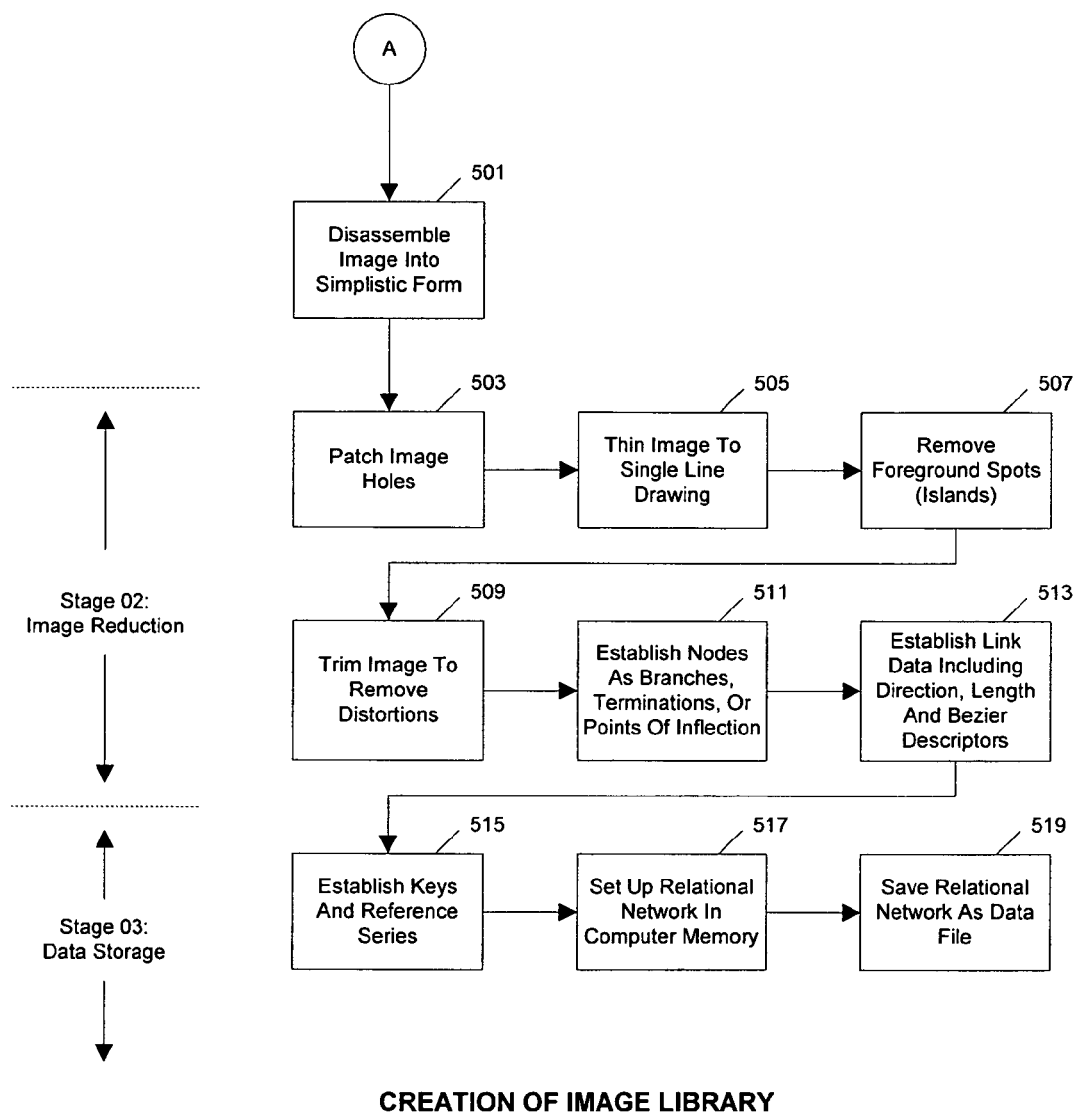
FIG. 5 is a diagram of the link and node structures for the characters "A"
Figure 6:
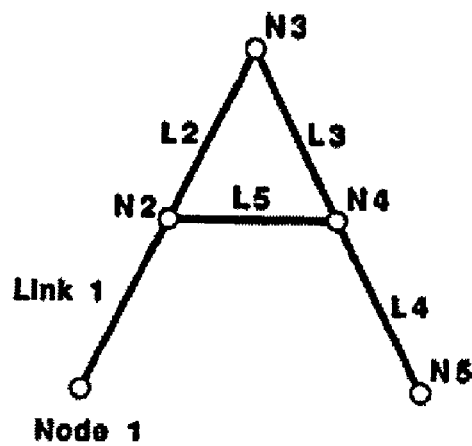
FIG. 6 provides a detailed illustration of image graph and image graph library creation according to one embodiment.
Figure 6:
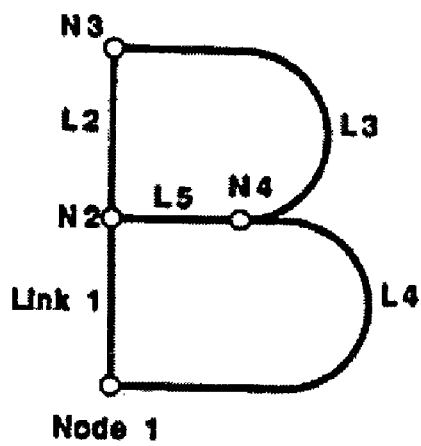
Figure 6:
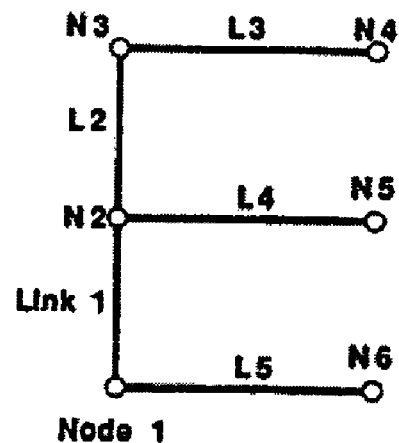

Referring back to FIG. 3, the construction of images graphs and isomorphic keys is depicted in step 305. FIG. 5 supplements step 305 of FIG. 3 by providing an in-depth illustration of an example of an image graph and isomorphic key generation process. Thus, turning now to FIG. 5, the generation of image graphs can involve an image reduction stage (Stage 02) and a data storage stage (Stage 03). The image reduction stage begins in step 501 wherein each image can be disassembled into a simplistic form of nodes (vertices) and links (edges). The image reduction process analyzes each character in the source language library and extracts detailed information concerning the character's link and node connections, wherein a node represents the intersection or termination points of lines within the image and the links representing actual lines. It is important to note that these characters also include the individual characters that make up the search terms gathered to establish the source language lexicon. FIG. 6 is an illustration of an exemplary link and node structures for the character "A". As shown, the character "A" has an internal structure of 5 nodes: 2 nodes have 1 link each, at the bottom of each leg, and the other 3 nodes have 2 links each, at the top and sides.

At the conclusion of the image reduction process, the original character image has been "reverse engineered" into a set of points linked with mathematical expressions. In effect, the character's image can be reduced to an electronic font that can be used to regenerate the image with a very high degree of precision on any scale. Additional details concerning the image reduction process depicted in FIG. 5, including patching image holes (step 503), image thinning (step 505), removal of foreground spots (step 507), trimming of images (step 509), and the establishment of node and link data (steps 511-513) are set forth in U.S. Pat. No. 5,276,332, and incorporated herein by reference as if set forth in full. Of course, it will be understood that other well known image reduction techniques can be used to implement image reduction in accordance with the systems and methods described herein.

Continuing on with respect to FIG. 5, once the characters are reduced in accordance with the image reduction process, the resultant image graphs can be subject to an isomorphic key generation process (03), wherein the image graphs can be stored as a series of relationships. The structure of stored data can best be illustrated diagrammatically. Specifically, the image information can be stored as a complex data type consisting of two parts: 1) a header, and 2) a connectivity network. The header can be a data record containing information which pertains to an image as a whole such as its ASCII representation, referencing key paths, number of links, number of nodes and a pointer to a single node in the connectivity network designated as the "head node." The headers are chained together in a linked list of information. Two important components of the header can include a Connectivity Key and a Connectivity Array, which are established in step 515 and described in more detail below.

Importantly, the header can also include a node and link count that represents the total number of links and node in the image. The pointer to the head node can identify a location in the memory where information on the head node is stored. The head node can be selected as the node in an image's connectivity network with the greatest number of links. Simply put, the purpose of the head node can be to serve as a port of entry into the connectivity network. Pathway points represent sequential paths through a library of several image data structures that are connected like links in a chain. These three paths, namely the ASCII representation, the Connectivity Key, and the Connectivity Array, permit passage in ascending order though the chain of image structures.

Figure 7:
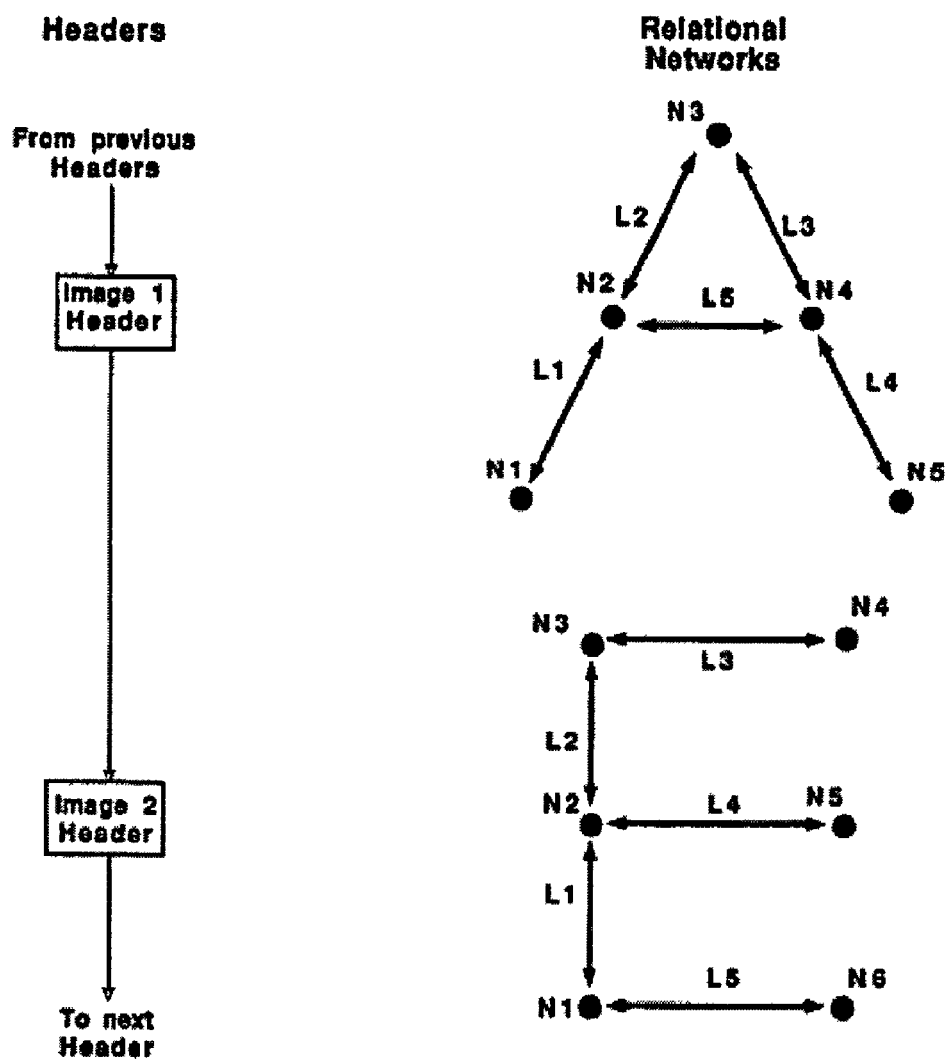
FIG. 7 is a diagram illustrating a data structure for the characters "A" and "E" and more specifically the relationship between an image header and a connectivity network.

As illustrated in steps 517 and 519, a connectivity network is established and saved as a data file. Particularly, a connectivity network is connected to the image header through the pointer to the head node. The connectivity network consists of a set of data elements that represent the node portion of the link/node structure. Each node is represented by a designated section of memory that holds information descriptive of the node. In short, using such a data format, it is possible to store all relationships in a vector structure. A diagram illustrating the relationship between the image header and the connectivity network is depicted in FIG. 7. Specifically, FIG. 7 illustrates the data structures for the characters "A" and "E".

b. Isomorphic Key Generation i. Connectivity Array

Referring back to FIG. 5, and more particularly to step 515, the established Connectivity Keys and Connectivity Array can be items contained in the header and used for quick screening of stored images prior to the searching process. The screening and searching processes are directly related to the manner and format by which information is stored. Specifically, the storage formats can permit screening and retrieval of information in two ways: 1) by Connectivity Key, and 2) by Connectivity Array.

The numeric Connectivity Array is an attribute of each image created to facilitate the screening and searching processes. Unlike the Connectivity Key, which is used for matching, the Connectivity Array is used to screen image comparisons to determine if a match is even possible between images in a document and the search term image graphs. Whereas the Connectivity Key works by "inclusion", the Connectivity Array works by "exclusion". The Connectivity Array consists of an array of integers, each of which represents a total number of nodes with a certain number of links. Connectivity Arrays can be tabulated for individual nodes as well as entire images.

In summary, the image reduction stage can result in a graph image library having skeletal representations for each character contained in the source language library. With the generation of the image graphs, documents in a foreign language may now be searched using pictographic recognition as described below.

ii. Connectivity Keys

The Connectivity Keys, on the other hand, are used for inclusionary screening. The Connectivity Key is generated and unique for a given number of nodes connected in a specific manner. In short, the Connectivity Key is a string of characters that distinguishes images from each other. The purpose of the key is to identify images with very similar characteristics for a more detailed analysis. The Connectivity Key captures the essence of the link/node relationships contained in the stored image data by storing this information in such a form that it can be referenced very quickly using conventional key referencing techniques.

Figure 8:
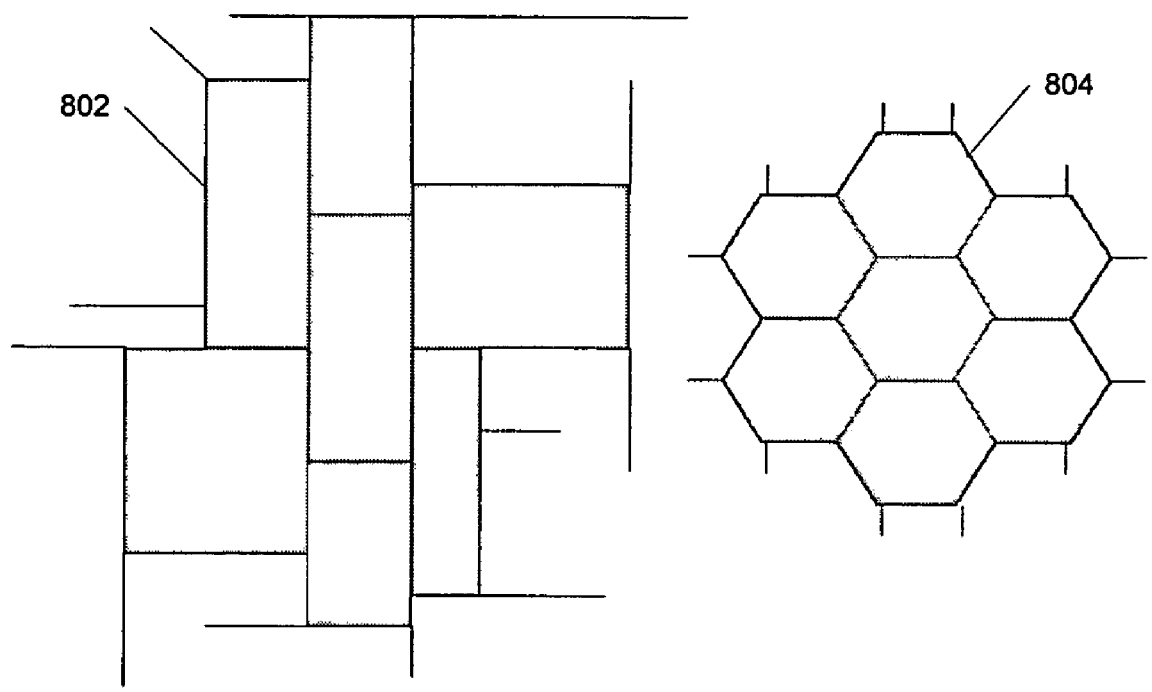
FIG. 8 is a diagram illustrating two example isomorphic graphs.

Connectivity Key generation can be viewed as a technique for generating a unique numeric value for each possible graph isomorphism. That is, two graphs sharing the same topology, e.g., having edges and vertices connected in the same way, should generate the same key, regardless how the edges and vertices are geometrically arranged. For example, FIG. 8 shows two isomorphic graph FIGS. 802 and 804. Although these figures appear to be different, their underlying graphs are structured identically, i.e., they are isomorphic.

The systems and methods described herein can be configured to use a method for detecting isomorphism by rearranging graph adjacency matrices. A graph's adjacency matrix can be defined as a two-dimensional table that shows the connections among vertices. In a typical adjacency matrix, vertices are shown along the (x) and (y) axes and the cells within the table have a value of "0" if there is not edge connecting the vertices and a value of "1" if the vertices are connected. The arrangement of "0's" and "1's" within the matrix is a function of the arrangement of vertices. Two graphs are isomorphic if their adjacency matrices align. That is, if the pattern of "0's" and "1's" is exactly the same, the two graphs must be identical. Theoretically, it is possible to consider all possible vertex arrangements to determine isomorphism. However, for a graph of Order "n", there are "n!" possible arrangements. The potential magnitude of this value, particularly if multiple graphs are to be compared, negates any benefit of brute force solutions to this problem.

In the systems and methods described herein, isomorphism is solved by applying an organized reordering to the matrix based on vertex connectivity. Under this approach, a matrix is reordered into a final state of "equilibrium" based on balancing a vertex's "upward connectivity" with its "downward connectivity". Upward connectivity is defined as the collective weight of all vertices of greater order to which a particular vertex is connected. Downward connectivity is described as the weight of all vertices of lesser order to which a vertex is connected. Order is defined as the number of edges emanating from a particular vertex.

Figure 9:
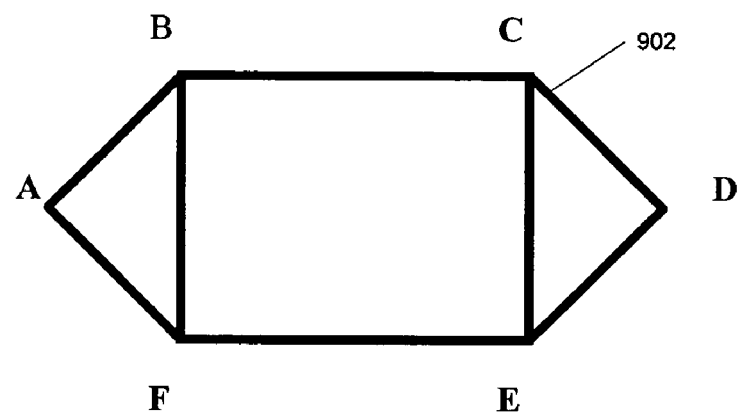
FIG. 9 is a diagram illustrating an example process for generating a connectivity key in accordance with one embodiment.

Upward and downward connectivity can be stored as an array of integers. FIG. 9 illustrates how these two types of connectivity can be established according to one embodiment. Using the concept of connectivity, it is possible to arrange the vertices into a consistent final state reflecting a balance between upward and downward connectivity. For isomorphic graphs, this state will take the form of an adjacency matrix with a certain final order for vertices, regardless of their original position in the matrix. All isomorphic graphs will transform into the same final state.

The following steps describe the process by which an adjacency matrix can be reordered using connectivity. These steps utilize some of the methods described in U.S. Pat. No. 5,276,332 and incorporated herein by reference as if set forth in full. Specifically, the concept of the Connectivity Array follows the methodology described for the Cumulative Reference series in the referenced patent. However, additional processes are applied for using information contained in the Connectivity Array that are not discussed in the referenced patent.

The Connectivity Array can, therefore, be built in the following manner. First, the connectivity for each vertex can be established through an array of integers. For example, the connectivity can be established by conducting a breadth first search from each vertex moving into all connected vertices and extending until a vertex of equal or greater order is encountered. This information is recorded in an array of integers where each value in the array maintains the count of vertices of a particular order encountered and the subscript reflects the actual order.

FIG. 9 presents a sample graph along with the Connectivity Arrays established for every vertex within the graph. Once the Connectivity Array has been established, the vertices are sorted by this array. Sorting can be performed by comparing the counts for similar order counts with the greatest weight given to the higher order counts. That is, the array elements corresponding to the "higher order" vertices, i.e., vertices with more edges, take higher precedence for sorting. For example, a "degree 4" vertices take precedence over a "degree 3" vertices, and so on.

Depending on the embodiment, once the sort is complete, connectivity can be balanced by two additional steps: 1) Pull, or Upward Connectivity, 2) Push, or Downward Connectivity. The Pull step can begin with the highest ranked vertex and working down the list of vertices, each vertex's lower ranked "neighbors", i.e. directly connected vertices, are examined. A "neighbor" vertex can then be "pulled" up the list if the preceding node meets the following criteria: a) The preceding vertex in the list has the same Connectivity Array (CA); b) The preceding vertex has not already been "visited" during this iteration; and c) The preceding vertex has an equivalent "visited by" list to the current node.

Logic underlying this process can be outlined in the following exemplary "Pseudo Code" description, generated according the requirements of one example implementation. This logic presumes construction of a vertex list from the sorting process with the highest ranked vertex at the top of the list and the lowest at the bottom. Ranking is performed by sorting using the Connectivity Array.

For each vertex in the vertex list

```
{
1. Get all "neighbors" (vertices connected to this vertex) in the
order in which they appear in the list and prepare a separate
"neighbor vertex list".
2. Mark this vertex as "visited".
3. For each neighbor in the neighbor vertex list
{
3.1 Get the vertex that precedes this neighbor in the vertex list.
3.2 While the neighbor's Connectivity Array = the preceding
vertex's Connectivity Array.
        And the preceding vertex is not "visited".
        And the neighbor's "visited by" list = the
preceding vertex's "visited by" list.
{
3.2.1 Swap the positions of the neighbor and the preceding vertex
in the vertex list.
3.2.2 Get the vertex that precedes this neighbor in the vertex list.
}
3.3 Mark this neighbor as "visited".
3.4 Mark this neighbor as having been "visited by" this vertex.
}
4. Clear all vertices of "visited" status.
}
```

The Push, or Downward Connectivity Step can begin with the lowest ranked vertex and working up the list of vertices, adjacent pairs of vertices in the list are examined, comparing the ranks of their "upstream" and "downstream" connections, i.e., directly connected vertex that are ranked above the vertex in the list and below the vertex in the list, respectively. A vertex can be "pushed" down the list if the following criteria are met: a) The subsequent vertex in the list has the same Connectivity Array, and one of the following is true: i) The subsequent vertex has stronger "upstream" connections, or ii) The "upstream" connections are equal and the vertex has stronger "downstream" connections. Determining "stronger" connections entails a pair-wise comparison of the sorted ranks of each vertex's connections, and the first unequal comparison establishes the stronger set.

The Push Process can be articulated in the following example Pseudo Code generated in accordance with one example implementation:

```
For index = N to 2
{
  1. Get vertex at position index −1
  2. Get the next vertex at position index
  3. If the vertex's Connectivity Array = the next vertex's
  Connectivity Array
  {
    3.1 Get the vertex's "upstream" and "downstream" connections
    3.2 Get the next vertex's "upstream" and "downstream"
    connections
    3.3 If the next vertex's "upstream" > vertex's "upstream"
    {
      3.3.1 Swap the positions of the vertex and the next vertex in the
      vertex list
    }
    Else if the "upstream" connections are equal
    {
      3.3.2 If the vertex's "downstream" > next vertex's "downstream"
      {
        3.3.2.1 Swap the positions of the node and the next vertex in the
        vertex list
      }
    }
  }
}
```

At the conclusion of the initial sort, the push process and the pull process, vertices are arranged in an order reflective of their balance between upward and down. At this point the adjacency matrix can be reordered to reflect this balance. Once the adjacency matrix has been reordered, the "0's" and "1's" within the matrix can become the basis for a numeric key that becomes a unique identifier for the matrix and a unique identifier for the isomorphism shown in the matrix.

The graph in FIG. 9 can be used to illustrate the key generation process. FIG. 9 presents a symmetrical graph 902 that requires the benefit of both Pull and Push techniques. It should be noted that the Push step may not be necessary for graphs that are not symmetric. Within FIG. 9, a table is provided that illustrates the Connectivity Arrays for each vertex. The Connectivity Array is computed by counting the number of vertices of particular order connected to each individual vertex. Because the highest order in the graph is 3—the most vertices emanating from a single edge is 3—the Connectivity Array includes orders up to and including 3.

Because vertices B, C, E and F have equal Connectivity Indices, they can be sorted into a number of orders with each one likely to be in the first sort position. For purposes of this illustration, it is assumed that sorting the vertices based on the Connectivity Array produced the following order:

(1) C, (2) B, (3) E, (4) F, (5) A, (6) D

Once this order has been established, the Pull step can be applied for upward connectivity. In this case, Vertex C can pull Vertex D ahead of Vertex A. This pull occurs because Vertex D is directly connected to Vertex C, which is in the first position. Vertex A is connected to Vertices B and F, neither of which is in a position higher than C. Once this rearrangement of order has been performed, there are no more changes to be made by the Pull process and the order is now shown as follows.

(1) C, (2) B, (3) E, (4) F, (5) D, (6) A

Next, the Push process is applied. The Push process moves vertices up—to the left in this example—based upon downward connectivity. In this case, Vertex E has stronger downward connectivity than Vertex B because Vertex E is connected to Vertex D, rank position 5, and Vertex B is connected to Vertex A, rank position 6. The result is Vertex D can push Vertex B ahead of Vertex E. This push reorders the series as follows.

(1) C, (2) E, (3) B, (4) F, (5) D, (6) A

Upon this change, the arrangement of vertices becomes stable and no additional pushing is possible. The result is a unique ordering that will always occur for this particular graph topology regardless the original ordering of the vertices.

The final step in this process involves taking the resultant adjacency matrix and converting it into a key. FIG. 10 shows the "before" and "after" versions of a graph adjacency matrix for graph 902 in FIG. 9. Since the matrix is by nature in a binary format, there are numerous ways to build it into a numeric key. One method is to assign sequential ranks to each cell in the matrix and multiply the integer 2, where n is the rank of the cell, by the value in the cell. Another method is to map the adjacency matrix into an integer with sufficient size to accommodate all the cells in the matrix. Either of these methods can, for example, yield an integer key that uniquely represents the graph's isomorphism.

iii. Building an Isomorphic Key Database

A key aspect of the systems and methods described herein can be the ability to perform Pictographic Pattern Recognition by bundling structure (isomorphic) and features (geometry). This can be accomplished by creating an isomorphic key database, that can be used during recognition to provide a one-to-one mapping between character forms embedded in unknown words, e.g., cursive or hand printed regardless of language, and a reference library of all allowable characters. It is possible to perform recognition using the concepts currently being discussed without building the isomorphic key database, the process can be quite computationally intensive and performance speed, and practical real time applications, can be greatly improved by converting the isomorphic matching process into a series of database retrievals rather than performing extensive calculations each time a comparison is made.

Figure 11:
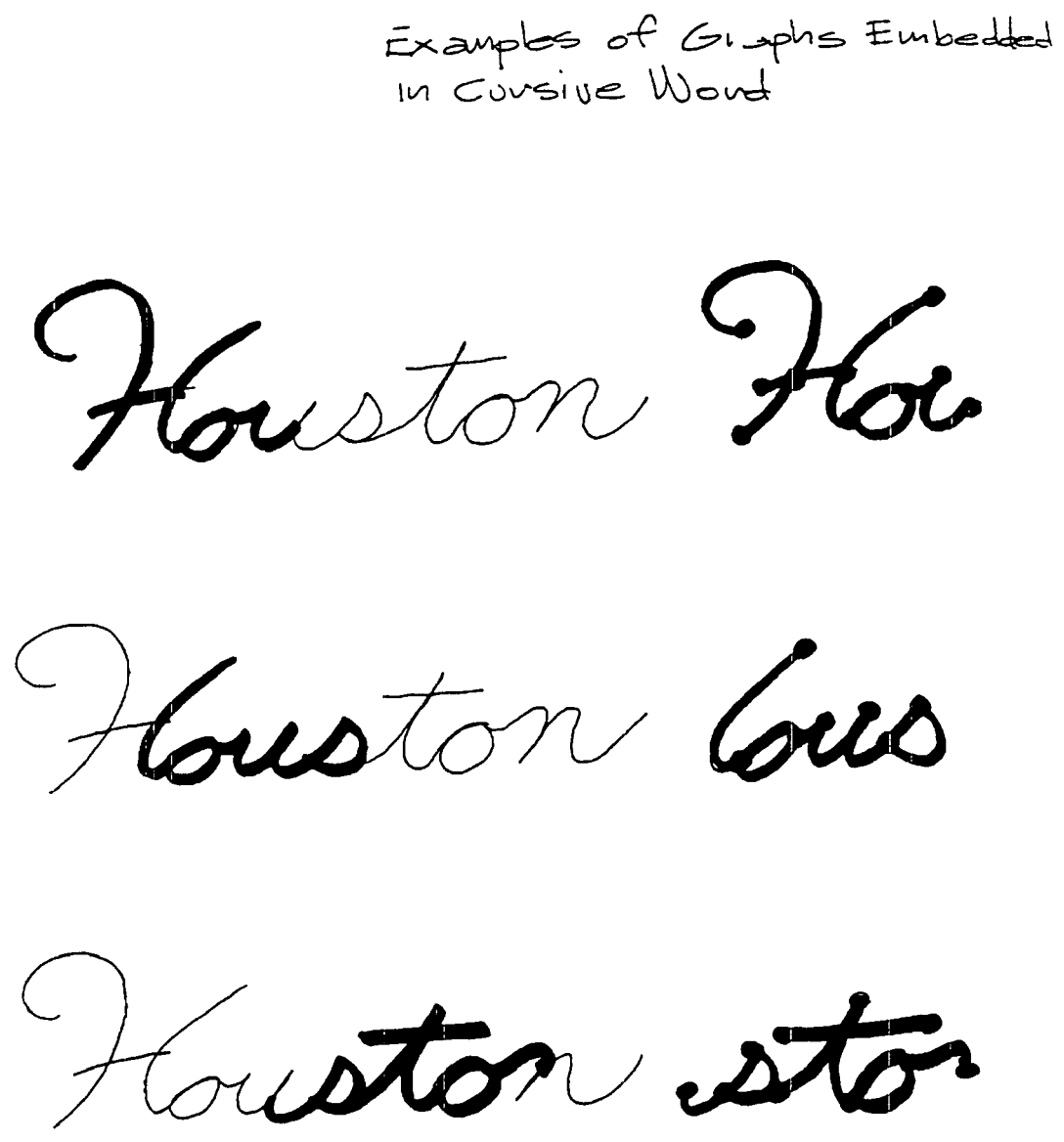

The concept underlying the creation of the isomorphic key database is the ability to predict all possible image graphs that are likely to be encountered in any unknown image during Pictographic Pattern Recognition. Furthermore, once predicted, these image graphs can be used to identify all occurrences of known image graphs that are within the unknown graph images. The known image graphs can be maintained within a reference collection, as described. The problem may appear computationally consumptive at face value. But if the maximum size of the unknown image graph to be considered can be limited, the problem becomes quite manageable. The question becomes one of finding a reliable criterion for capping the size of the unknown image graphs to be considered. FIGS. 11 and 12 illustrate the concept of image graphs encountered in a cursive English word. The concept of embedded image graphs readily applies to all written languages.

In the systems and methods described herein, a cap, or upper limit, on the size of the unknown image graphs can actually be derived as a lower limit. Simply stated, an unknown image graph must be sufficiently large so that there is a very high probability that it has embedded within it the most complex item from the reference library. Thus, one way to approach a solution would be to require that the unknown image graph be larger than the largest item in the reference library. One measure of graph size is graph "order", which is the number of vertices within an image graph. Thus, if the largest item in the reference library is of order 8, then an unknown image graph likely to contain it should be of order 8 or larger. Experimentation has shown that an order 8 graph works very well for a Roman character set. This value also appears to hold for Cyrillic or Arabic; however, a larger value is needed to address the Japanese and Chinese character sets. FIG. 12 shows how known image graphs can be embedded in unknown image graphs.

The concepts from the above paragraphs can be restated in the following manner. A Pictographic Pattern Recognition process for comparing image graphs can be greatly facilitated if a database is created which contains all possible image graphs likely to be encountered in any form of writing and if the database locates within these image graphs all items from the reference library of known image graphs, which are embedded in the unknown image graphs. At face value, this seems to be undermined by combinatorics because there are an enormous number of unknown image graphs, which can be generated by all past, present, and future writers. But if a size limitation is placed on the unknown image graph, which will be considered below, the problem becomes not only manageable, but also manageable within readily available technology such as microcomputers.

The reason that it becomes manageable is that if only image graph structure is considered, it is possible to predict all image graph structures up to a given size. For instance, an order 8 graph can have no more that 8 vertices and 18 edges. Thus, if each edge is viewed as having two states, either 1 or 0, a complete planar order 8 graph can be "decomposed" into 2 sub graphs which translates into 262,144 graph, which is a very manageable number that can be managed on a one-time basis during the creation of a database.

Thus, the challenge becomes finding an image graph sufficiently small so that it can be used to develop a database sufficiently large so that it can more than adequately contain the largest item in the reference library. The key to this determination is within the reference library itself since it is often the case that the image graph size must be determined as the order of the most complex reference item multiplied by some "comfort factor". The comfort factor is derived by experimentation using a large set of handwriting samples. For the English language character set, encompassing both handprint and cursive script, the orders from 8 to 11 can be sufficiently large. However, different languages and character sets can require that this value be expanded. Thus, the order used depends on the specific implementation requirements.

The concepts expressed through the above points illustrate the premise underlying the isomorphic database: it is possible to create a database of all conceivable image graphs that can be either systematically or randomly extracted from the larger graph of an unknown image. This database can contain all image graphs of a prescribed order and their entire sub graphs. One-to-one mapping between all the image graphs yields a unique isomorphic key and all references to the database can be performed as key lookups.

For example, one database record can be produced for each possible image graph up to a prescribed size, i.e. order 8. Records can be of variable length and can contain the following fields: a) Index key, which can be a unique key generated by each graph which is the prime way of access to the database. For discussion purposes, the graph that produces this key can be referenced as the "Prime Graph"; b) Mapping Mask, which can be a group of characters whose internal bit values are used to isolate sub graphs within the Prime Graph, which correspond to items in the reference library. To accomplish this, each edge in the Prime Graph is assigned a sequence order, which corresponds on a one-to-one basis with a bit in a mapping mask value. By considering only those edges which map onto bits with a value of "1", it is possible to isolate a sub graph within the Prime Graph. This sub graph will be isomorphic to at least one item on the reference library; c) Sub graph Keys, which can be keys generated for each sub graph isolated through the use of mapping mask. The unique key produced from its internal structure is also stored in the database. This value is useful in the recognition process for making the actual match between the isolated sub graph and isomorphic items in the reference library; and d) Translation Sequence, since the key generation process actually derives the unique key by recording the vertices (nodes) within the graph in a special way, this ordering sequence is stored in the database so that as each sub graph is isolated. Its vertex order can be arranged exactly as it result as if it had been processed using the isomorphic key methodology herein described. The correct ordering of vertices is necessary during the actual recognition process.

Thus, once the database is created, it is possible to use it to isolate all reference library items which are embedded in any graph up to the highest order used to produce the database. Whereas, the ability to link the reference library to the unknown image does not constitute the entire recognition process, it can be an important part of the process in that the isolations established by the database and its ability to bundle the unknown image and reference library elements makes the recognition process "self segmenting".

iii. Isomorphic Key Database Creation

The isomorphic key database can be created in a very straightforward way. Although the process can be optimized, for discussion purposes it is best described in non-optimized form. In fact, since the process by which the isomorphic database is created need only be executed once, prior to the implementation of the recognition system, there is little practical need to optimize the process The isomorphic key database is created by generating all possible image graphs up to a certain order; creating a unique key for each image graph; then if the key has not been previously created, creating a record which is added to the isomorphic key database. Since this process is best described by example, the steps illustrated by the flow chart of FIG. 13 can be used to outline how the isomorphic key database can be created for all graphs of order 8 or less. The logic of database creation is described through the following steps.

Figure 14:
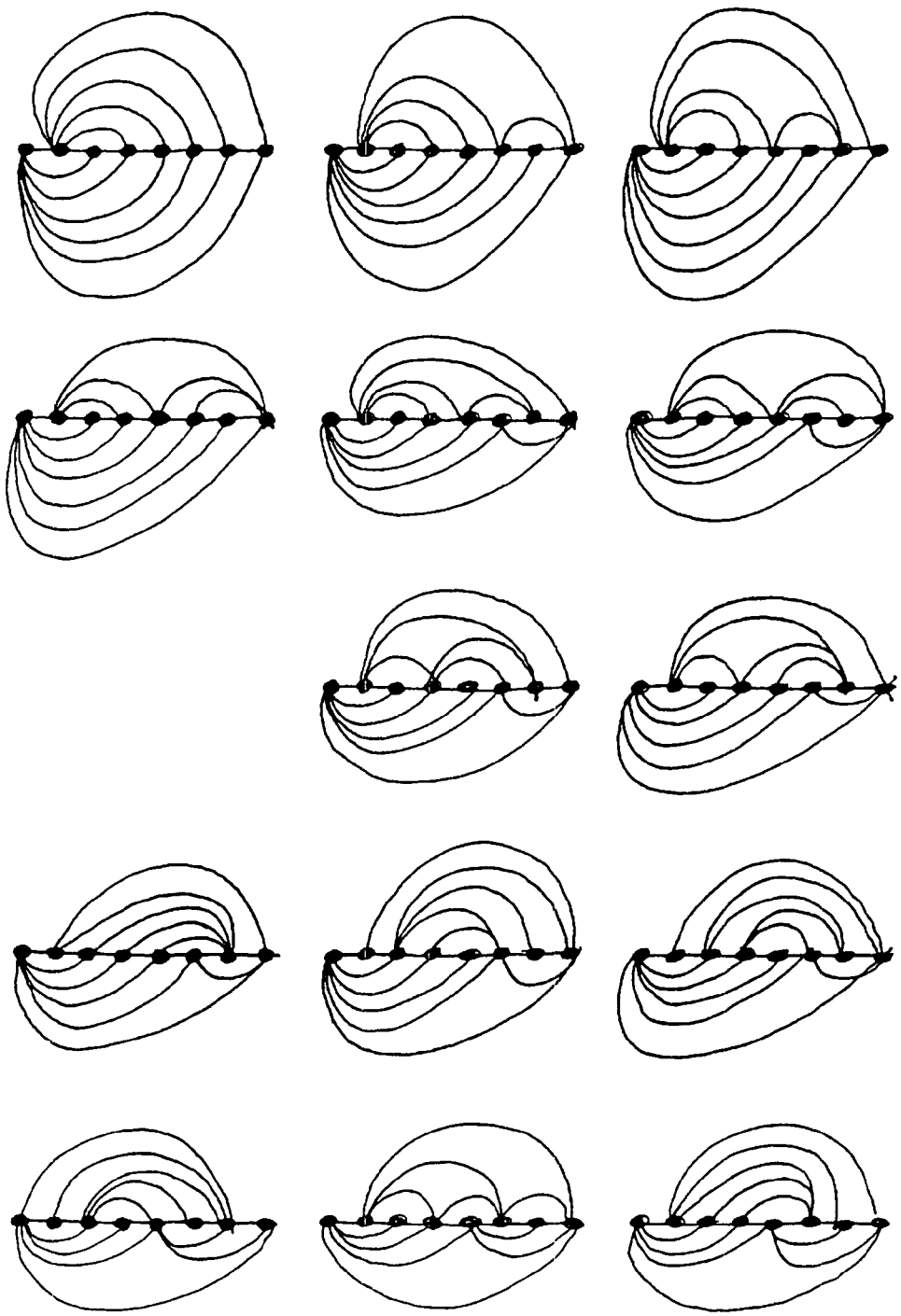
FIG. 14 is a diagram illustrating maximally connected planar graphs of order 8.

First, in step 1302, it is necessary to establish all non-isomorphic maximally connected planar image graphs of order 8. Since this technique can apply to written material, the image graphs can exist within the same plane, i.e., planar image graphs. Further, these graphs should be fully connected with all vertices connected as many times as possible. For an order 8 graph in a plane, the maximum possible number of vertices is 18. A graph with the maximum number of vertices is referenced as a "complete" graph. To establish these image graphs an algorithm, which systematically generates all possible image graphs without regard for isomorphism, can be used. This algorithm can generate thousands of image graphs, each of which can be used to generate a unique key indicating isomorphism. From experimentation on all possible order 8 graphs that can be produced, it can be shown that there are only 14, which are non-isomorphic. These 14 become the basis of the database. FIG. 14 illustrates examples of the 14 non-isomorphic order 8 graphs.

The following table shows the number of non-isomorphic complete planar graphs from graphs ranging in order from 1 to 12.

| ORDER | COMPLETE NON-ISOMORPHIC GRAPHS |
|---|---|
| 2 | 1 |
| 3 | 1 |
| 4 | 1 |
| 5 | 1 |
| 6 | 2 |
| 7 | 5 |
| 8 | 14 |
| 9 | 50 |
| 10 | 233 |
| 11 | 1249 |

The resulting example image graphs are now ready as ingredients for database generation. They can be referenced as "Master Graphs".

In step 1304, the actual process for generating the isomorphic key database can use a binary masking system. That is, it assumes every edge in the Master Graphs can be represented by "0" or "1". If only those with a stated value of 1 are considered at any time, it is possible to isolate all possible sub graphs. The total number of sub graphs is equal to $2^n$, where n is the total number of edges in the Master Graph.

Figure 15:
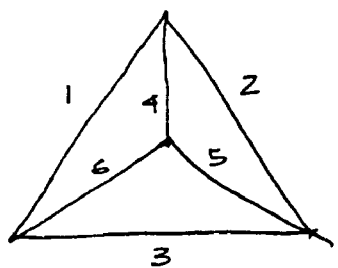
FIG. 15 is a diagram illustrating an example method for edge masking to isolated embedded word segment graphs in accordance with one embodiment.
Figure 15:
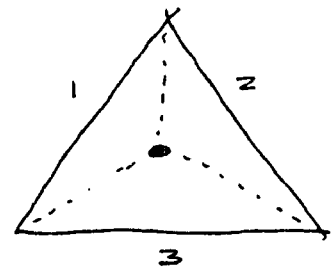
Figure 15:
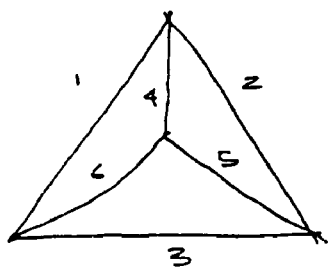
Figure 15:
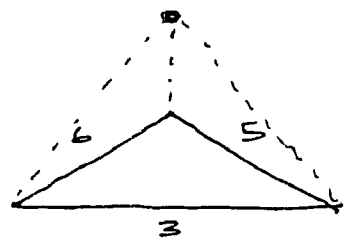
Figure 15:
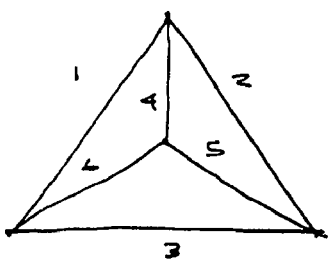
Figure 15:
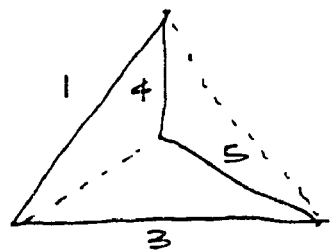
Figure 15:
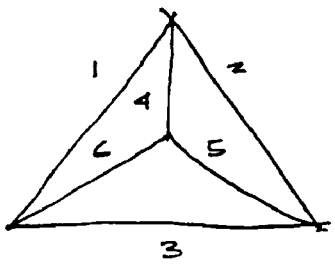
Figure 15:
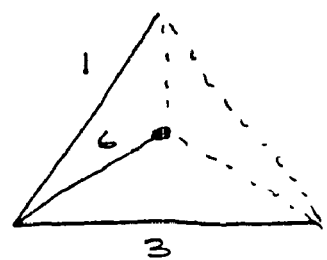
Figure 16:
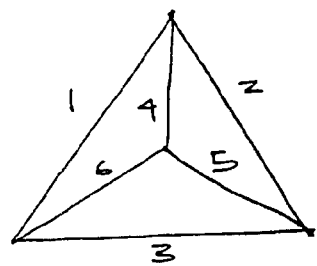
FIG. 16 is a diagram illustrating an example method for masking bits in a counter in accordance with one embodiment.
Figure 16:
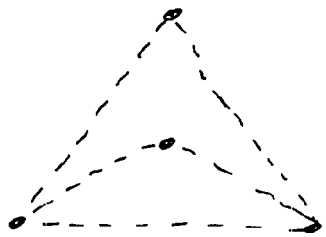
Figure 16:
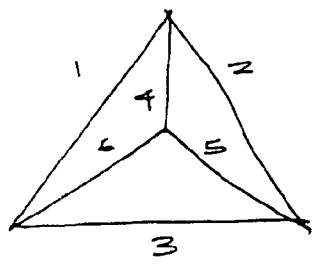
Figure 16:
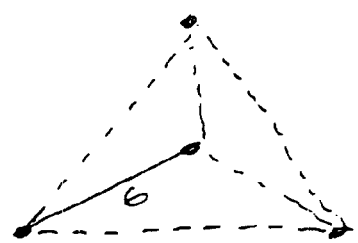
Figure 16:
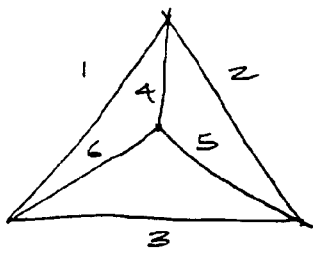
Figure 16:
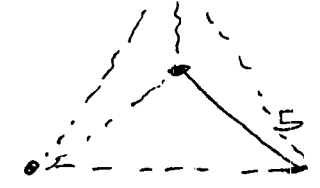
Figure 16:
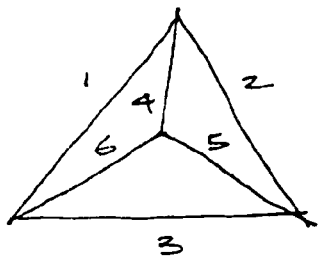
Figure 16:
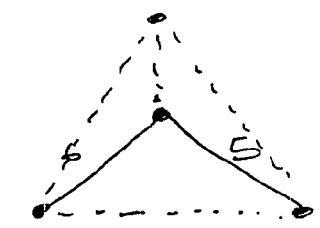

In certain embodiment, a counter can be used to cumulatively track the results. As the counter increments in value, each of its bits can be associated with an edge in the Master Graph. For each change in the counter value, a sub graph from within the Master Group can be isolated that conforms only to those bits with 1 as their value. Although there is signification redundancy, this process ensures that all possible sub graphs are considered. A generic illustration of masking is shown in FIG. 15. FIG. 16 shows how masking can be linked to a counter to isolate sub graphs.

In step 1306, as each sub graph is isolated, a unique key is generated. This key is checked against those already in the isomorphic key database. If it is not found then a record is created. Clearly, the rate of record generation will be quite high at first since when the process starts the isomorphic key database is empty. However, because of frequent isomorphisms the number of new records produced drops dramatically as the process continues. For image graphs containing parallel edges, all occurrences of parallel edges are isolated into separate graphs and processed by the same methods herein described creating an additional key, or keys, depending on the quantity and arrangement of the parallel edges.

In step 1308, in those cases where a new graph that is not isomorphic with any image graph previously encountered is generated, and thus a new record is produced, actual record production is done recursively by generating a list of all sub graphs in the new graph using the previously described masking process. As each of these graphs is produced a key is created and the key is compared with items in the reference library. If a match is found the following three actions can take place: a) The key for the sub graph can be saved; b) The mask can be saved; and c) The Vertex Reorganization Sequence is Saved.

Whereas the key and masks have been previously described, the node translation requires further elaboration. The unique key can actually be produced by reordering, as described above, a graph's vertices, then bit-converting the graph's adjacency matrix into a series of numerals or characters, as illustrated in FIG. 15. For the example shown in this figure, the actual reordering procedure can be recorded as in the following renumbering instructions:

Renumber vertex 2 as vertex 1;
Renumber vertex 1 as vertex 2;
Renumber vertex 3 as vertex 3;
Renumber vertex 5 as vertex 4;
Renumber vertex 6 as vertex 5; and
Renumber vertex 4 as vertex 6.

Figure 17:
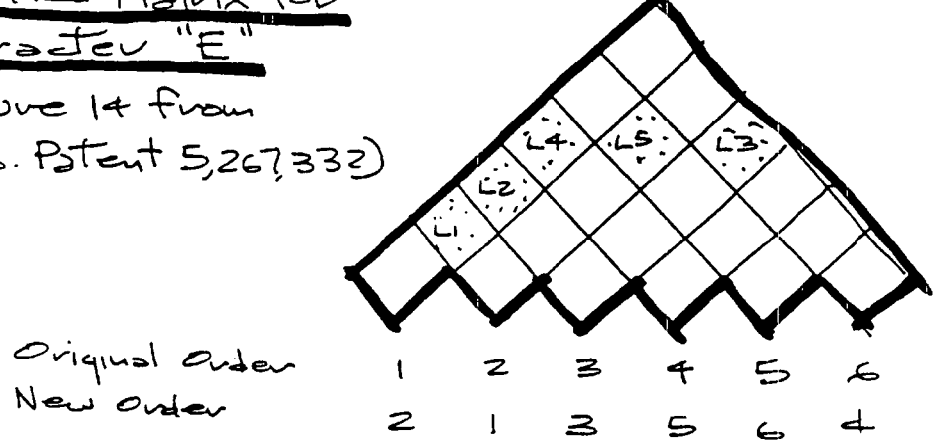
FIG. 17 is a diagram illustrating an example relationship between a translation sequence and a weighted key matrix.

These renumbering instructions can be converted into a "Translation Table" which juxtaposes old and new values. The relationship between an adjacency matrix reordered by connectivity equilibrium as previously described and the translation table is also shown in FIG. 17. For each mapping contained in a database record, a full translation table can be provided.

In step 1310, the final step is to save the data record. This record can be stored as a disk file, which can be directly loaded into memory as a linked list or array. The record can contain: a) A mask that isolated a valid sub graph from the prime graph; b) A key for the isolated sub graph; c) A translation sequence by which the vertices in the isolated sub graph can be ordered so that the key can be extracted from their adjacency matrix.

Figure 13:
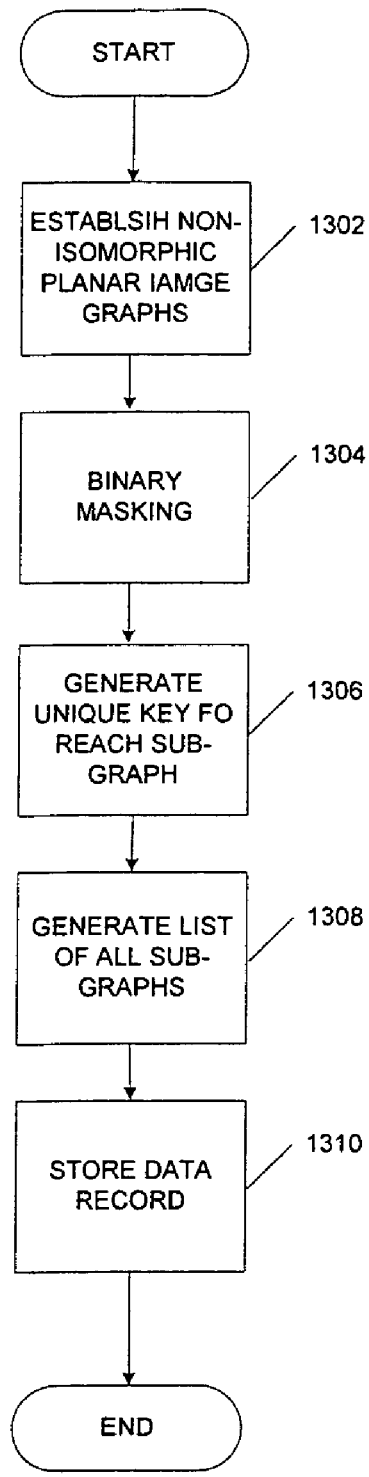
FIG. 13 is a flow chart illustrating an example process for creating an isomorphic key database in accordance with one embodiment.

Through the steps illustrated in FIG. 13, an isomorphic key database can be generated. Since this database provides the direct bridge between unknown image graphs and the known image graphs in the reference library, it must be regenerated every time a new element is added to the library if this new element is structurally different from all other items in the library.

As previously mentioned, an isomorphic key database represents the second step in multi-step approach toward Pictographic Pattern Recognition. The third part takes the form of the actual application of the information in the database during Pictographic recognition. This process is described in the ensuing paragraphs.

3. Comparison of Image Graphs with Test Document

Because search terms are identified based on visible patterns/images generated in association with the term, an image recognition system configured in accordance with the systems and methods described herein can demonstrate superior searching capabilities over the conventional image recognition systems described above.

For example, suppose for counter-terrorism purposes, a search for the term "bomb" is applied to a voluminous compilation of foreign language documents. In many instances, a conventional system can interpret the letter "m" as "rn" thus yielding the unrecognizable word of "bomb". Specifically, the breaks in the letter 'm' often confuse conventional OCR systems into interpreting the characters as "rn." However, since the image recognition system configured in accordance with the system and methods described herein searches for a graphical representation of the words "bomb," a slight defect in the graphical character will still correlate closely with the same words in the documents being searched. Although there might be some slight erroneous image discontinuities in the letter "m", it will still correlate closely with the search graph image.

Furthermore, the image graphs generated from data compiled in the source language library include various forms of individual characters as well as information on how these characters might be connected and arranged in written text. Additionally, correlations between allographs and various fonts can be taken into consideration. For example, certain forms of a character may not be included in every font. Moreover, one allograph for the letter 'a' may only appear in the same font as that for a specific allograph of 'g.' Incorporating the correlation between these allographs reduces the number of graphs generated. In some embodiments, not all characters in a word need to be included. For example, a graph corresponding to "arm m nt" is as likely to find the word "armament" as the graph corresponding to "armament." As a result, fewer graphs in the group of graphs generated need to be generated.

Referring back to FIG. 3, once the image graphs, associated with the source language library, have been successfully constructed, the comparison process between the image graphs and the documents can begin. As illustrated in step 307, the physical documents can be placed into electronic format. Unlike conventional systems, however, the documents are not subjected to optical character recognition or automatic translation. Rather, the document is simply placed into electronic format.

Image creation can be achieved by electronically scanning the physical documents as shown in step 309. Scanning technology is an accepted and widely available means of converting "paper-bound" information into electronic form. During this process, the scanner creates an "electronic image" of the document by interpreting it as a dot pattern and then storing the dot pattern in a prescribed graphics format such as TIFF. Typical resolution quality of the image may range from less than 100 up to 600 "dots per inch." Once in this electronic form, the image is ready for interpretation. For the purpose of simplicity, a physical document placed into electronic format is referred to as an imaged document. Additionally, it is important to note that the image graph library generated in step 305 can also be referred to as a reference library. Similarly, the imaged document may also be referred to as a test reference. Thus, the screening and searching processes described below are performed by comparing the imaged document, or test image, against each image graph in the image graph library, or reference library.

Once the physical documents are imaged (step 309) and once the image graphs of the source language library have been generated (step 305), the image matching process can begin. The image matching process entails subjecting the imaged document to the image graph generation steps as described below.

Figure 18:
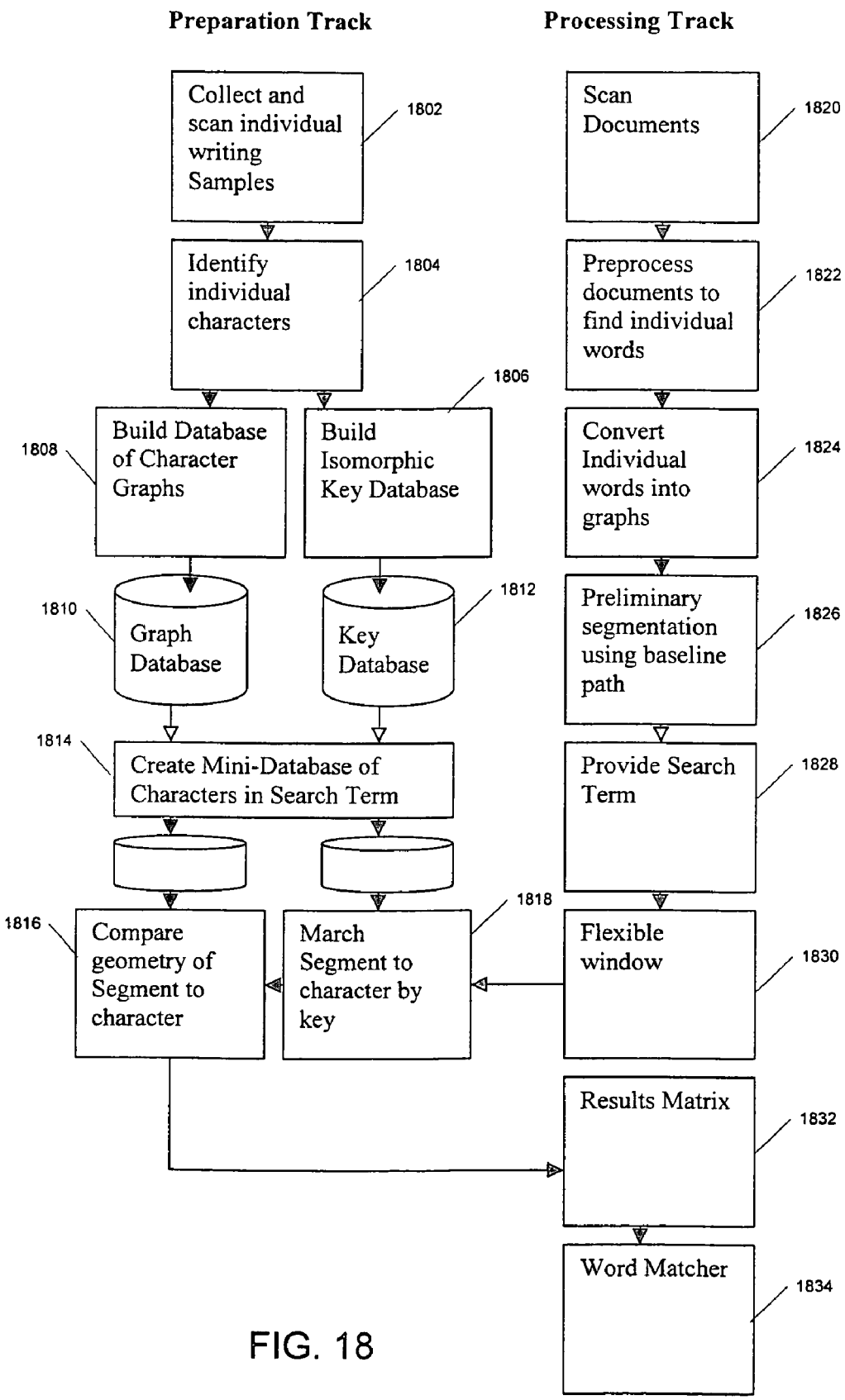
FIG. 18 is a diagram illustrating an example method for pictographic searching in accordance with on embodiment.

The ability of the present invention to locate specified search terms in scanned documents is illustrated in more detail in the flow chart of FIG. 18. As can be seen, the process can comprise two sub-processes: preparation and processing. The actual process of image detection, however, includes the following stages and corresponding steps:

Stage 01: Image Reduction (steps 1802 and 1804);
Stage 02: Graph Generation (step 1806);
Stage 03: Isolation (step 1806);
Stage 04: Connectivity Key Generation (step 1808);
Stage 05: Connectivity Key Matching (step 1808);
Stage 06: Feature Comparison (step 1816);
Stage 07: Results Matrix Generation (step 1832); and
Stage 08: Word Matching (step 1834).

Figure 19:
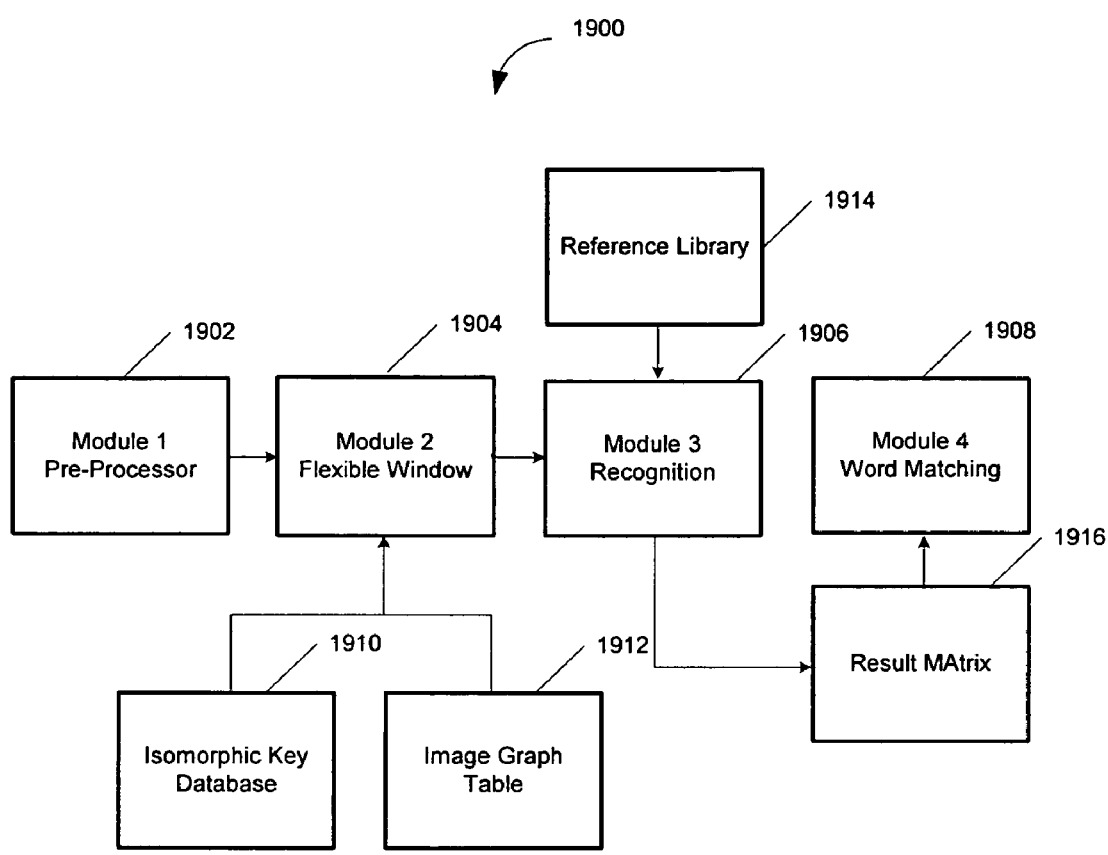
FIG. 19 is a diagram illustrating a pictographic search system configured to implement the process illustrated in FIG. 17.

The 8 stages identified can, for example, be performed by 4 functional modules as illustrated by the example pictographic recognition system 1900 of FIG. 19. System 1900 comprises the following modules: Module 1: Pre-processor 1902; Module 2: Flexible Window 1904; Module 3: Recognition 1906; and Module 4: Word Matching 1908 and Dynamic Programming.

Module 1: Pre-processor 1902 can be configured to perform stage 01: Image Reduction and stage 02: Graph Generation, while Module 2: the Flexible Window 1904 can be configured to perform stage 03: Preliminary Segmentation which can include, preliminary segmentation as described below, stage 04: Connectivity Key Generation, stage 05: Connectivity Key Matching, and stage 06: Feature Comparison. Module 3: Recognition 1906 can be configured to perform stage 07: Results Matrix Generation and Module 4: Word Matching 1908 can be configured to perform stage 08: Word Matching, which can comprise search term tuple matching as described below.

It should be noted that the modules 1-4 depicted in FIG. 19 can comprise the hardware and/or software systems and processes required to implement the tasks described herein. Thus, different implementations can implement modules 1-4 in unique manners as dictated by the needs of the particular implementation.

It should be noted that Module 2 and 3 can be configured to work hand in hand throughout the recognition process by constantly cycling through stages 04, 05, and 06. In this way, segmentation and classification become a unified cohesive process. As image graphs are isolated, they are compared to the image graphs relevant to the search term. If an isomorphic match is found, the matched unknown image graphs must bear some resemblance to reference characters in the search term and are suitable for classification. The classification process assigns a confidence value to this resemblance.

Pre-processor 1902 can be configured to translate binary images into graph forms. In this context, a graph is a mathematical structure consisting of line segments (edges) and their intersections (vertices). The actual graph forms generated by Pre-processor 1902 can be viewed as single line representations of their original images. The graphs, as stored in computer memory, contain all information required to regenerate these single line representations.

An Image Graph Constructor configured in accordance with the systems and methods described herein can be configured to convert binary images into graphs through 2 steps: Image Reduction and Graph Generation. Image Reduction can consist of identifying points in the original image, that correspond to vertices in the related graph, which is a single line re-creation of the image. Once the vertices have been established, the edges become those portions of the image that connect between vertices.

There are alternative techniques for accomplishing the Image Reduction. As described above, one approach is to use a skeletonization technique to "thin" the image into a single line form, and then to identify vertices based upon prescribed pixel patterns. The skeletonizaton method is well documented through numerous alternative approaches. Another technique would be to identify "nodal zones" as the intersection of major pathways through the image. This can be done by calculating the tangents of the contours of an image and comparing the length of these tangent lines to an average stroke width for the entire image. The tangents become quite long near nodal areas. In either case, the desired output should remain consistently as follows: a) A list of connected components; b) For each line: Pointers to the corresponding nodes, pointers to the line's contours, pointers to the contour end points, and the estimated direction of the line at each end; c) For each node: An ordered list of node-line connections. The order in the list corresponds to the attachment of the line ends to the node when traveling clockwise around the node; and d) For each node-line connection: A pointer to the line, and the identification of which end connects to the node. In addition, a pointer to the portion of the node's contour that follows the connection clockwise.

Upon receiving the above data, Pre-processor 1902 can be configured to commence the Graph Generation. This stage can entail creating a single-line structure comprised of edges and vertices. This stage can be used to establish the proper edges, and designate their intersections as vertices. Skeleton data can be used directly. If contour data is provided, the contours are first converted into single-line data representing the "mid-line" of parallel contours. Once the contours have been converted to edges and the nodes to vertices, the end points for each edge are associated with the proper vertices. At this point the "rough" form of the graph has been created.

The next step entails graph refinement. First, the Degree 2 vertices are created. There are two types of Degree 2 vertices: a) Corners, and b) Zero Crossings. Corners represent points at which relatively straight line segments change direction. Zero crossings are points at the juxtaposition of opposing curves. The peak at the top of an upper case "A" is a good example of a corner and the center point of the character "S" illustrates the concept of a zero crossing.

Once the Degree 2 vertices have been added, further refinements are preformed. These include: a) Removal of insignificant features; b) Closure of gaps; and c) Merger of features in close proximity.

Integral to the image graph is the actual method by which it is stored. Rather than drawing upon the common practice of storing information in the form of data elements, graph information can be stored as a series of relationships. That is, rather than storing information as a linear data record, graph information is stored as a series of memory locations with each location containing both data an "pointers" to other locations. Pointers are variables, which contain addresses of memory locations; each pointer exactly replicates the vector nature of the vertices and edges of the graphs they represent.

Equating this concept to the edge/vertex structure of a graph, each memory location represents a vertex and each pointer to another location represents an edge. The concept as described so far provides a good descriptor of the structural relationships that comprise a graph; however, they do not address the issue of features, which is critical to the visual representation of both graphs and characters. Aside from the pointers stored at the vertex memory locations additional data is also stored to describe the features of the various edges, that intersect at a particular vertex. These data include all salient information captured during the Image Reduction process including directional information, distance measurements, curvature descriptors and the like.

A moving window that travels across a word 1904 can be configured to analyze processed word graphs using a Flexible Window concept. This concept represents an application of Graph Theory. In operation the Flexible Window isolates connected sections within a cursive word form that conform to items in the Reference Library of character forms. The Flexible Window 1904 effectively uses a "Virtual Window" of variable size corresponding to the grouping of edges and vertices extracted at any given time. Thus, it performs both segmentation and recognition in a single step. Fundamental to the operations of the Flexible Window 1904 is the use of isomorphic graph keys, which are the actual tools, used to identify portions of a cursive word, which match items in the Reference Library. Isomorphic graph keys are rooted in the premise that any two graphs which are structurally identical, e.g., the same number of edges and the vertices connected in the same manner, can be described by the same unique key. The key under discussion is actually derived for the adjacency matrix for the graphs and thus, the concept of key matching is equivalent to comparing the adjacency matrices for two graphs. If the adjacency matrices of two graphs match, they are isomorphic or structurally identical. The process of Connectivity Key generation is a straightforward process herein described. The best way to illustrate the function of the Flexible Window 1904 is to describe its activities on a step-by-step basis.

Figure 20:
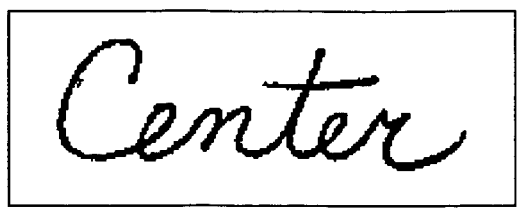
FIG. 20 is a diagram, illustrating an example process for creating a baseline path in accordance with one embodiment.
Figure 20:
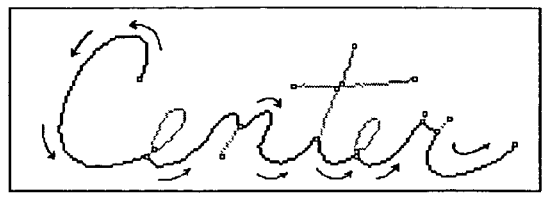
Figure 20:
Figure 20:
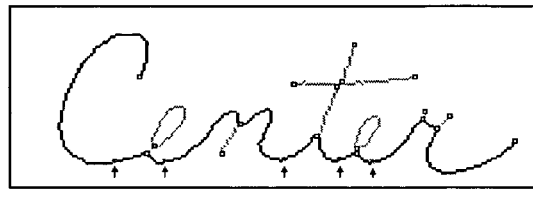
Figure 20:
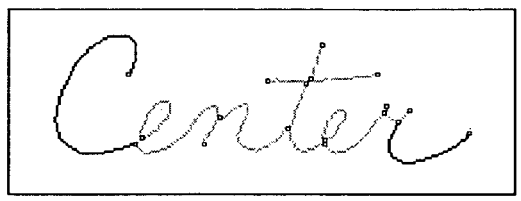
Figure 20:
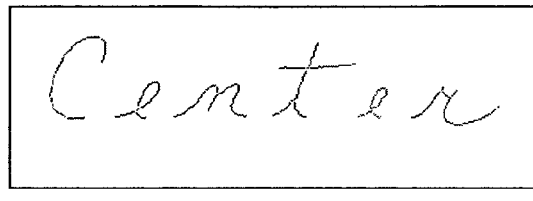
Figure 20:
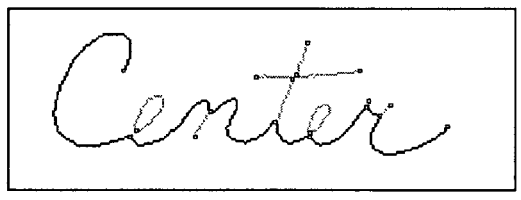

First, the Flexible Window 1904 can be configured to use the concept of the Baseline Path. For illustrative purposes, FIG. 20 shows examples of how a Baseline Path can be generated according to one embodiment of the systems and methods described herein. Item a in FIG. 20 shows a sample word image. Processing is done to "skeletonize" the image into a graph object with vertices (nodes) and edges (FIG. 20, Item b). In this example, the regular dots represent points on an edge and the box dots represent vertices.

The process for creating the baseline path starts by identifying the left-most and right-most lowest edges (shaded darker) in the graph object model (FIG. 20, Item c). In the illustrative example, this would be the "C" and the trailing edge of the letter "r" respectively:

The next step involves constructing a series of connected edges from this graph object model that starts at the left-most lowest edge and ends at the right-most lowest edge. This, in essence, creates a "path" through the graph of an imaged word. Since handwriting is usually connected on the bottom of a word, this process will create a "baseline" path (FIG. 20, Item d).

Figure 21:
FIG. 21 is a diagram illustrating exemplary segmentation zones in accordance with one embodiment.
Figure 21:
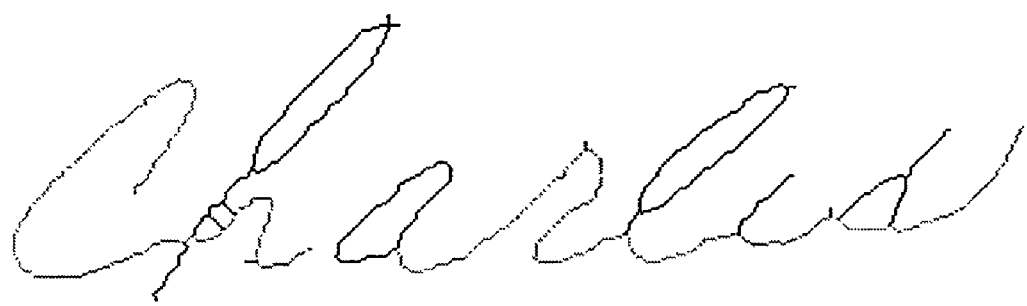

For disconnected handwriting, all of the above processes are repeated on each individual connected sub-graphs. For example take the word "Charles" (FIG. 21, Item a). This word becomes the graph with baseline path shown in light gray (FIG. 21, Item b). As shown in the illustration, the above process outlined is repeated on the two sub-graphs.

With the construction of the baseline path, it is now possible to segment automatically cursive words or streams of connected characters into individual letters. For illustrative purposes, the word "Center", in FIG. 20, can be used as an example. FIG. 20, Item d shows the word Center processed into a set of connected edges along the base of the word.

The segmentation routine works on all edges except for the last one and is accomplished by "walking" along the baseline path. Since, trailing edges are usually connected to a letter they should not be processed. Also, the walking direction of an edge is determined by the general direction of walking from the starting edge to the trailing edge. To illustrate, directional arrows are shown on the Center example in FIG. 20, Item e.

Figure 22:
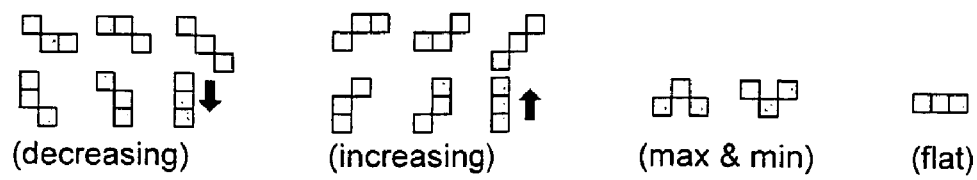
FIG. 22 is a diagram illustrating example pixel pattern for the segmentation zones of FIG. 20.
Figure 22:
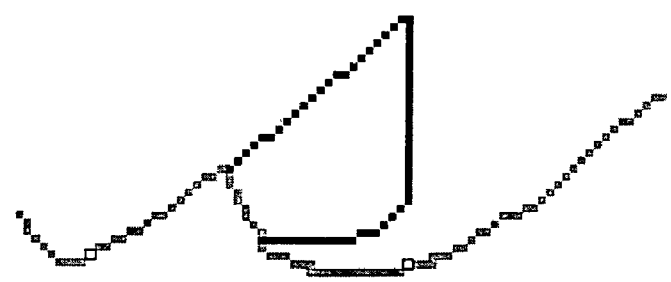
Figure 22:
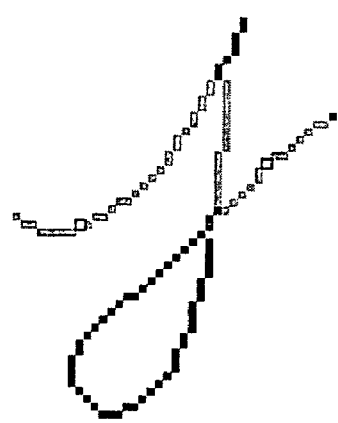

"Walking" along an edge, follows a path that consists of states from using 3 consecutive pixels. The 3 pixels give rise to 5 states (flat, increasing, decreasing, minimum, and maximum). These are illustrated in FIG. 22, Item a. These states are assuming a walking direction from left to right except where ambiguous; the ambiguity is resolved by indicating a direction with an arrow.

The following rules apply to the segmentation process: Rule #1—Before beginning segmenting, find a decreasing state before any segmentation is allowed. Once this state has been noted, a "break" will be made at the first increasing point after this decreasing state has been detected. Subsequent breaks along the same edge must follow this pattern as well. For very short edges, minimums are also considered for breaking points. This is the first set of heuristics, which the segmentation algorithm follows; Rule #2—The second set of rules involves analysis of an edge being a "connector". A connector is defined to be an edge that separates the graph into 2 distinct pieces, i.e., the sub-graph to the left of the starting vertex and the sub-graph to the right of the ending vertex of an edge share nothing in common. The sub-graph to the left must contain the starting edge. And the sub-graph to the right must contain the ending (trailing) edge. All edges that may have breakpoints must follow this rule; and Rule #3—When an edge follows the above two rules, breakpoints are computed. If no breakpoints can be found, then the last rule is used. If the states were mostly increasing, it was most likely to be an ascending connector. One break is made on the midpoint of an edge like this.

The first two rules can be shown through the following example. FIG. 22, Item b shows the skeleton of the cursive lowercase 's' with baseline edges in light gray and breakpoints in box dots. The first two rules must be followed for there to be a break. Therefore, the breaks would occur at the box dots.

FIG. 22, Item c, provides an example of the second and last rule using lowercase 'j' On the edge with the second breakpoint, rules #1 and #2 were never encountered. But rule #2 and #3 were encountered and a breakpoint was made in the "middle" of the edge. It should be noted that the strictly descending edge in the middle of the 'j' does not follow rule #1 or #3.

In the selected example, the word "Center" has breakpoints (FIG. 20, Item f.) at the following locations indicated with arrows. Once these breakpoints are found, the process of creating letters can begin. Each breakpoint gives rise to 2 edges. Each distinct grouping of edges between breakpoints forms a subgraph that we dub a letter. FIG. 20, Item g, shows the output of the word center using this definition. The technique illustrated is intended for cursive script English and other "naturally" cursive languages such as Arabic. This technique is usually not necessary for hand or machine printed words, since printed characters are typically segmented by the nature of writing.

When handwriting an "i" or a "j", diacritics are typically used such as a dot floating above them. For purposes of segmentation, this case is handled by treating the dot as a sub-graph and spatially putting it as close between two letters as possible.

Figure 23:
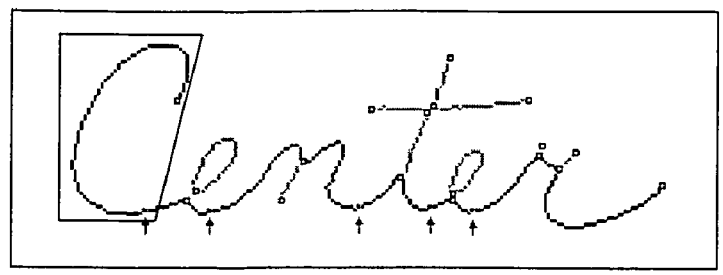
FIG. 23 is a diagram illustrating a example method for the progression of a flexible window in accordance with one embodiment.
Figure 23:
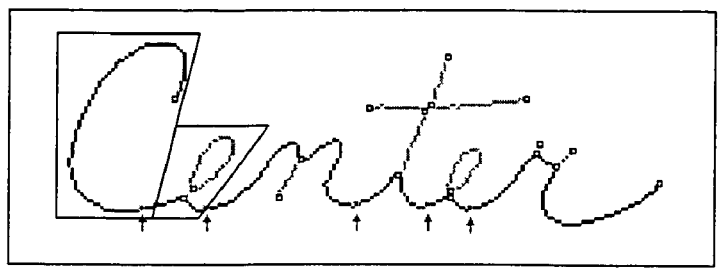
Figure 23:
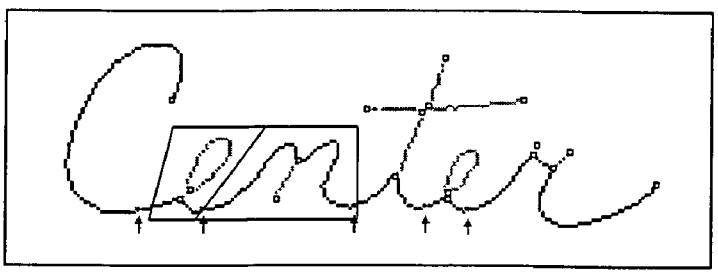
Figure 23:
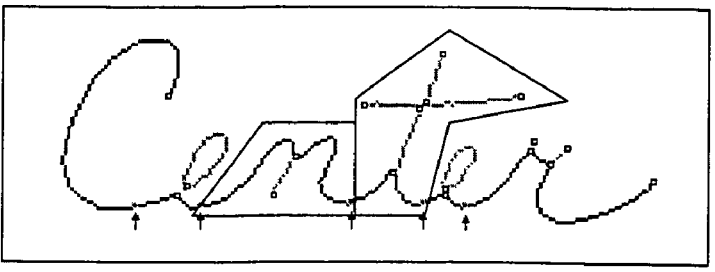

The Flexible Window 1904 can be configured to move in an "inchworm" fashion from one segmented zone to another. Typically this process moves from left to right, but this order is not mandatory. For languages such as Arabic, the Flexible Window would move from right to left following the natural written order of the language. Thus, the process creates a "Virtual Window" of variable size, which encompasses all items in a segmented zone at a given time. This is illustrated in FIG. 23. It should be noted, however, that rather than using a fixed size the variable window is a product of the size and position of extracted edges that is contains. As previously discussed, a table 1912 of all possible graph forms is available to support the recognition process. Table 1912 can be created on a one-time basis only and serves as an ongoing resource to the recognition process. For instance, if the isomorphic database is configured to include all graphs up to order 11 (11 vertices), the total number of vertices in the segmented zones should not exceed eleven.

Using the Connectivity Key generated from an Order 8 or less graph extracted from unknown image graphs, the Flexible Window 1904 can be configured to locate the matching record in isomorphic key database 1910. Since all possible graph forms are in the database, a record will always be found through this lookup process. This record contains a series of masks, which serve as the bridge between all sub graphs within the unknown graph and items in the Reference Library. The size of the mask will correspond to the size of the graph being processed. For instance, a graph with eight edges, will have an 8-bit mask and a graph with twelve edges will have a 12-bit mask. Thus, considering a graph with eight edges as an example, the actual process for matching against Reference Library graphs is driven by information extracted from the database in the form of a string of 8-bit masks in which the bits set to "1" designate the edges in the graph which should be considered.

Through the use of masks a series of sub-graphs can be generated from within the Order 8 or less graph extracted from the unknown image. The Flexible Window 1904 guarantees that each item in this series is structurally identical to at least 1 item in the Reference Library.

At this point, matching has been made only in terms of structure with no consideration given to features. Thus, while the Flexible Window 1904 guarantees a topological match, most of the graphs isolated by Flexible Window 1904 are not necessarily valid characters. However, the probability is very high that the correct characters are within the set of graphs isolated by the Flexible Window 1904. Such a determination, however, can only be made while giving consideration to geometry. Thus, this is the point at which the Flexible Window 1904 passes information to the Recognizer 1906.

The Recognizer 1906 can be configured to make the actual determination whether a graph isolated by Flexible Window 1904 conforms to an item in the Reference Collection. This determination is made on the basis of feature comparisons.

Following is a listing of sample features used for this purpose, each with an attendant narrative description: Absolute Distance, which can be the physical distance among graph edges and vertices; Centroid Direction, which can be the direction from graph edges and vertices to the center of mass of the graph; Centroid Distance, which can be the physical distance from individual graph edges and vertices to the center of mass of the graph; Edge Area Moments, which can be the second moment of individual graph edges; Edge Aspect Ratio, which can be the ratio of height to width for individual edges; Exit Direction, which can be the direction an edge exits a vertex; Expected Distance, which can be the position of an edge or vertex in one graph based on the position of a corresponding edge or vertex in another graph; and Graph Direction, which can be the direction from one graph component (edges and vertices) to another. The above mentioned features are provided for illustrative purposes only and do not represent a comprehensive listing of all features that can be used to compare isomorphic graphs to determine whether they represent the same character.

Since the graphs extracted from the unknown image and their corresponding graphs from Reference Library 1914 are guaranteed by Isomorphic Database 1910 to be structurally isomorphic, by definition they must have the same number of edges and vertices connected in the same manner. In addition to guaranteeing this correspondence, Isomorphic Database 1910 also guarantees alignment. That is, the features from graphs extracted from an unknown image are mapped to the corresponding features of the known reference graphs. This is a one-to-one correspondence, which establishes which features must match for a valid comparison to occur. The align is achieved by rearranging the vertices as per the translation code from isomorphic database 1910. The concept of alignment was previously discussed in terms of vertex translation and the "Translation Table".

Thus, since the alignment is known, the task of Recognizer 1906 is to assign a level of confidence to the comparison between the known and unknown graph forms. The basis for determining this confidence is rooted in distance measurement. In practice, it has been found that unknown characters which receive the lowest distances scores usually resemble the known character to which they have been matched. As the distances rise, the topological structure still holds but the visual similarity disappears.

As Recognizer 1906 classifies characters, it can be configured to record the results with scores above a prescribed threshold. The Recognizer 1906 also can have a feedback mechanism, which eliminates from consideration simple embedded forms, which are likely to occur in more complex forms. For instance, a single stroke character such as "I" occurs in almost every complex character. Thus, if a complex character is identified, it is not necessary to evaluate every simple form, which may be embedded inside it.

Once the Recognizer 1906 has completed its work, it places its results in Results Matrix 1916. The Results Matrix 1916 can be a tool for identifying characters embedded within a cursive word with their actual physical locations. The Result Matrix 1916 can contain the following information: a) Character name, e.g., from Reference Library 1914; b) Physical coordinates in image (x1, y1)-(x2, y2); and c) Distance Score: how far the features from the unknown word matched the features of the known characters.

The contents of the Results Matrix 1916 are passed directly to the Word Matcher 1908, which can be attempts to match the search term with characters in Results Matrix 1916.

Underlying the Word Matcher 1909 is the concept of tuples: 3 letter combinations of letters, which are sequential but not necessarily contiguous. A word is matched by mapping tuples generated from individual words in the unknown image against the prescribed search term. Once the scores have been established, they can be ranked with the highest one selected as the most likely choice. To facilitate the matching process, a full set of tuples is generated for the search term. This listing is used to map the tuples from the unknown word against the search term in a very efficient manner. When placed within the recognition environment, system 1900 will continually be confronted with new listings of words or names. Thus, system 1900 can continually regenerate master sets of tuples. Also underlying the Word Matcher is the concept of Dynamic Programming which compares two character patterns and determines the largest pattern common to both.

The Word Matcher 1908 allows for some fuzziness when mapping tuple against words. Fuzziness relates to the position in which a character occurs. An exact tuple match would mean that every character extracted from the Results Matrix matched the exact character positions in the search term. The introduction of fuzziness means that the character location can be "plus or minus" a certain prescribed distance from the actual position of the search term characters they match. This "prescribed value" can be a variable, that can be adjusted. However, if a tuple maps against a word with variation greater than the prescribed fuzziness, it should not be scored as a valid match. The quantity of tuples from the matrix matched against the search term determines whether a document should be flagged for further investigation. Dynamic Programming is a well documented method for comparing patterns in character strings. For present purposes, the contents of the Results Matrix can be considered to be one string and the search term can be considered to be the other string. In the case of the present invention, however, the Results Matrix offers alternative choices for particular character string positions. This represents an extension over traditional Dynamic Programming approaches.

4. Further Analysis of Flagged Documents

Returning again to FIG. 3, if a successful match is returned in step 313, the image document is flagged for further analysis as shown in step 315. The flagged document may then be submitted to an interpreter in either its electronic form or in its physical format. Nevertheless, an interpreter fluent in the foreign language reviews the flagged document. It is important to note that the comparison and searching steps continue for each imaged document as indicated in steps 317 and 318. Because this process is continuous, voluminous documents may be searched in an efficient manner.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. An image recognition system for searching documents in a source language comprising:
   an imaged document, the imaged document being stored in a document database;
   a source language library for storing source language search terms;
   an image graph constructor coupled to the document database and the source language library, the image graph constructor configured to generate search term image graphs from the source language search terms, and generate a collection of image graphs representing the imaged document by performing an image graph generation process, the process comprising the steps of:
      reducing characters included in the source language search terms and in the imaged document to skeleton images comprising a plurality of nodes and a plurality of connections,
      ordering the plurality of nodes for each skeleton image in a first order;
   reordering the plurality of nodes for each skeleton image in a second order, wherein the second order is the same for all characters having the same number of nodes connected by the same number of connections between nodes;
      representing the skeleton images of the characters on the basis of an internal structure of the character by a descriptor corresponding to a plurality of nodes and connections between the plurality of nodes of the character, wherein the descriptor is a Connectivity Key that is unique for a given plurality of nodes and connections between the given plurality of nodes, the unique Connectivity Key corresponding to the second order of the plurality of nodes, and
      constructing the search term image graphs and collection of image graphs from image graphs of the characters;
   an image graph database for storing the search term image graphs and the collection of image graphs generated by the image graph constructor; and
   a comparison module coupled to the image graph database, the comparison module configured to search the imaged documents by comparing the collection of image graphs with selected search term image graphs, wherein if at least one image graph from the collection of image graphs matches the selected search term image graphs, the imaged document is flagged as containing a search term justifying further analysis of the document.

2. The system of claim 1, wherein the source language is any language other than English.

3. The system of claim 1, wherein the imaged document is an electronic version of a physical source language document.

4. The system of claim 3, wherein the imaged document is generated by scanning the physical source language document.

5. The system of claim 1, wherein the source library further includes a collection of source language characters.

6. The system of claim 5, wherein the collection of source language characters-includes written and typographical variations of each source language character.

7. The system of claim 1, wherein the image graph constructor is further configured to perform the image graph generation process, the process comprising the steps of: reducing the character to a skeleton image; representing the skeleton image of the character in the form of a linked list comprising a plurality of entries and a plurality of pointers between the entries, organized on the basis of internal structure corresponding to a plurality of nodes, and connections between the plurality of nodes, wherein each of the plurality of entries in the linked list corresponds to one of the plurality of nodes, and each of the pointers between entries corresponds to one of the connections batch nodes; and storing the image graph of the character as the representation of the internal structure of the character.

8. The system of claim 7, wherein the the image graph database is configured to store the skeleton image of each character as a data structure having a header and a connectivity network.

9. The system of claim 8, wherein the header includes at least a Connectivity Array and the Connectivity Key.

10. The system of claim 9, wherein the Connectivity Array can comprise a reference for a given node of a given character, and wherein the reference can be a series of integers, each integer being equal to the number of nodes having a given number of connections between nodes, connected the given node.

11. The system of claim 9, wherein the Connectivity Key is unique for a given plurality of nodes and connections between the given plurality of nodes, the unique Connectivity Key corresponding to a Connectivity Array for each node of the character.

12. The system of claim 9, wherein the comparison module is configured to execute a screening process and a searching process.

13. The system of claim 12, wherein the screening process conducts two screening methods including a screen by Connectivity Key method and a screen by Connectivity Array method.

14. The system of claim 13, wherein the screening by Connectivity Key is conducted to determine whether the Connectively Key contained in the header of the imaged graph search term matches the Connectivity Key contained in the header of an image graph of the collection of image graphs.

15. The system of claim 14, wherein if the screening by Connectivity Key is successful, the searching process is activated.

16. The system of claim 14, wherein if the screening by Connectivity Array is successful, the searching process is activated.

17. The system of claim 13, wherein the screening by Connectivity Array is conducted by comparing the Connectivity Array associated with the search term image graphs with the each Connectivity Array associated with the collection of image graphs.

18. The system of claim 12, wherein the searching process employs a depth first search.

19. The system of claim 12, wherein the searching process computes the number of connections between the nodes for each image graph in the collection of image graphs to the number of connection nodes in the search term image graph for at least first and second ones of the search term image graphs and link ratios for the first and second stored search term image graphs.

20. A method for identifying search terms in a document written in a source language, comprising:
a processor configured to perform the following:
establishing a source language lexicon, the source language lexicon including source language search terms;
creating an image of each of the characters contained in the foreign source language lexicon using an image graph constructor;
reducing the image of the characters to a skeleton image comprising a plurality of nodes and a plurality of connections;
ordering the plurality of nodes in a first order;
reordering the plurality of nodes in a second order, wherein the second order is the same for all characters having the same number of nodes connected by the same number of connections between nodes;
representing the skeleton images of the characters using a Connectivity Key that is unique for a given plurality of nodes and connections between the given plurality of nodes, the unique Connectivity Key corresponding to the second order of the plurality of nodes;
providing an imaged document in the source language;
generating search term image graphs representing the source language search terms using the character images and generating a collection of image graphs representing the imaged document;
searching the imaged document by comparing the collection of image graphs to inputted search term image graphs; and
flagging imaged documents when an image graph from the collection of image graphs matches one of the selected search term image graphs.

21. The method of claim 20, wherein the establishment of the source language lexicon comprises:
identifying characters associated with the source language; and
identifying written and typographical variations for each character.

22. The method of claim 20, wherein the establishment of the source language lexicon further comprises:
identifying search terms in a first language; and
interpreting the search term from the first language to the source language using an interpreter fluent in the source language.

23. The method of claim 22, wherein the interpreter supplements the source language lexicon by identifying, in the source language all colloquial variations of the source language search terms in the source language.

24. The method of claim 20, wherein the source language lexicon non Roman characters.

25. The method of claim 20, wherein the imaged document is an electronic version of a physical source language document.

26. The method of claim 25, wherein the imaged document is generated by scanning the physical source language document.

27. The method of claim 20, further comprising storing the skeleton image of each character as a data structure having a header and a connectivity network.

28. The method of claim 27, wherein the header includes at least a Connectivity Array and the Connectivity Key.

29. The method of claim 28, wherein the Connectivity Array can comprise a reference for a given node of a given character, and wherein the reference can be equal to the number of nodes having a given number of connections between nodes, connected to the given node.

30. The method of claim 28, wherein the Connectivity Key is unique for a given plurality of nodes and connections between the given plurality of nodes, the unique Connectivity Key corresponding to a Connectivity Array for each node of the character.

31. The method of claim 28, wherein the comparison module is configured to execute a screening process and a searching process.

32. The method of claim 31, wherein the screening process conducts two screening methods including a screen by Connectivity Key method and a screen by Connectivity Array method.

33. The method of claim 32, wherein the screening by Connectivity Key is conducted to determine whether the Connectivity Key contained in the header of the imaged graph search term matches the Connectively Key contained in the header of an image graph of the collection of image graphs.

34. The method of claim 33, wherein if the screening by Connectivity Key is successful, the searching process is activated.

35. The method of claim 33, wherein the screening by Connectivity Array is conducted by comparing the Connectivity Array associated with the search term image graphs with the each Connectivity Array associated with the collection of image graphs.

36. The method of claim 33, wherein if the screening by Connectivity Array is successful the searching process is activated.

37. The method of claim 31, wherein the searching process employs a depth first search.

38. The method of claim 31, wherein the searching process computes the number of connections between the nodes for each image graph in the collection of image graphs to the number of connection nodes in the search term image graph for at least first and second ones of the search term image graphs and link ratios for the first and second stored search term image graphs.

39. The method of claim 20, further comprising
storing the Connectively Key representation of the internal structure of each of the character as a description of the character.

* * * * *